(12) United States Patent
Chatterjee et al.

(10) Patent No.: US 9,273,243 B2
(45) Date of Patent: Mar. 1, 2016

(54) LIGHT WEIGHT PROPPANT WITH IMPROVED STRENGTH AND METHODS OF MAKING SAME

(71) Applicant: Halliburton Energy Services, Inc., Houston, TX (US)

(72) Inventors: Dilip Chatterjee, Houston, TX (US); Jody Pham, Houston, TX (US); Shanghua Wu, Houston, TX (US); Yuming Xie, Houston, TX (US); Christopher E. Coker, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 232 days.

(21) Appl. No.: 13/846,136

(22) Filed: Mar. 18, 2013

(65) Prior Publication Data

US 2013/0206408 A1    Aug. 15, 2013

Related U.S. Application Data

(63) Continuation of application No. PCT/US2011/055010, filed on Oct. 6, 2011.

(60) Provisional application No. 61/392,508, filed on Oct. 13, 2010.

(51) Int. Cl.
*C09K 8/80* (2006.01)
*C04B 35/64* (2006.01)
(Continued)

(52) U.S. Cl.
CPC ... *C09K 8/80* (2013.01); *C01G 1/02* (2013.01); *C04B 33/1352* (2013.01); *C04B 33/30* (2013.01); *C04B 33/32* (2013.01); *C04B 35/117* (2013.01); *C04B 35/6261* (2013.01); *C04B 35/62695* (2013.01); *C04B 35/62807* (2013.01); *C04B 35/62886* (2013.01);
(Continued)

(58) Field of Classification Search
CPC ........ C09K 8/80; C04B 35/64; C04B 38/009; C04B 2235/5463; C04B 2235/5481
See application file for complete search history.

(56) References Cited

U.S. PATENT DOCUMENTS 2,625,512 A * 1/1953 Powell ............................ 252/62
4,921,820 A    5/1990 Rumpf et al.
(Continued)

FOREIGN PATENT DOCUMENTS

| WO | 2007067774 |  | 6/2007 |
|----|------------|---|--------|
| WO | 2008028074 | A2 | 3/2008 |
| WO | 2012040025 | A2 | 3/2012 |

OTHER PUBLICATIONS

International Search Report and Written Opinion issued in corresponding International Patent Application No. PCT/US2011/055010, dated Jun. 7, 2012 (18 pages).
European extended search report for EP Application No. 11833145.3 dated Sep. 30, 2015.

*Primary Examiner* — Erin Snelting
(74) *Attorney, Agent, or Firm* — Craig W. Roddy; Tumey L.L.P.

(57) ABSTRACT

Methods are described to make strong, tough, and/or lightweight glass-ceramic composites having a crystalline phase and an amorphous phase generated by viscous reaction sintering of a complex mixture of oxides and other materials. The present invention further relates to strong, tough, and lightweight glass-ceramic composites that can be used as proppants and for other uses.

15 Claims, 1 Drawing Sheet

Schematic showing the structure of a proppant with a hollow template

(51) Int. Cl.

| | |
|---|---|
| *C04B 38/00* | (2006.01) |
| *C04B 33/135* | (2006.01) |
| *C04B 33/30* | (2006.01) |
| *C04B 33/32* | (2006.01) |
| *C04B 35/117* | (2006.01) |
| *C04B 35/626* | (2006.01) |
| *C04B 35/628* | (2006.01) |
| *C04B 35/645* | (2006.01) |
| *C01G 1/02* | (2006.01) |
| *E21B 43/267* | (2006.01) |

(52) U.S. Cl.
CPC .............. *C04B 35/64* (2013.01); *C04B 35/645* (2013.01); *C04B 38/009* (2013.01); *E21B 43/267* (2013.01); *C04B 2235/3217* (2013.01); *C04B 2235/349* (2013.01); *C04B 2235/3463* (2013.01); *C04B 2235/528* (2013.01); *C04B 2235/5436* (2013.01); *C04B 2235/5481* (2013.01); *C04B 2235/6562* (2013.01); *C04B 2235/666* (2013.01); *Y02P 40/69* (2015.11)

(56) References Cited

U.S. PATENT DOCUMENTS

| | | |
|---|---|---|
| 7,459,209 B2 | 12/2008 | Smith et al. |
| 7,491,444 B2 | 2/2009 | Smith et al. |
| 7,867,613 B2 | 1/2011 | Smith et al. |
| 7,883,773 B2 | 2/2011 | Smith et al. |
| 7,887,918 B2 | 2/2011 | Smith et al. |
| 7,914,892 B2 | 3/2011 | Smith et al. |
| 8,003,212 B2 | 8/2011 | Smith et al. |
| 8,012,533 B2 | 9/2011 | Smith et al. |
| 8,047,288 B2 | 11/2011 | Skala et al. |
| 8,075,997 B2 | 12/2011 | Smith et al. |
| 8,168,570 B2 | 5/2012 | Barron et al. |
| 8,178,476 B2 | 5/2012 | Xie et al. |
| 8,178,477 B2 | 5/2012 | Skala et al. |
| 8,298,667 B2 | 10/2012 | Smith et al. |
| 2006/0016598 A1 | 1/2006 | Urbanek |
| 2011/0160104 A1 | 6/2011 | Wu et al. |
| 2012/0157358 A1 | 6/2012 | Fang et al. |
| 2012/0190597 A1 | 7/2012 | Chatterjee et al. |
| 2013/0014945 A1 | 1/2013 | Fang et al. |

\* cited by examiner

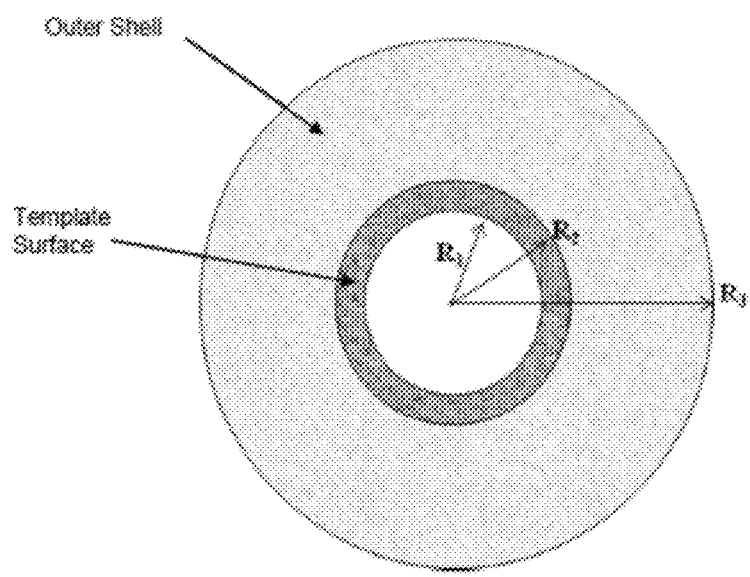
Figure 1. Schematic showing the structure of a proppant with a hollow template
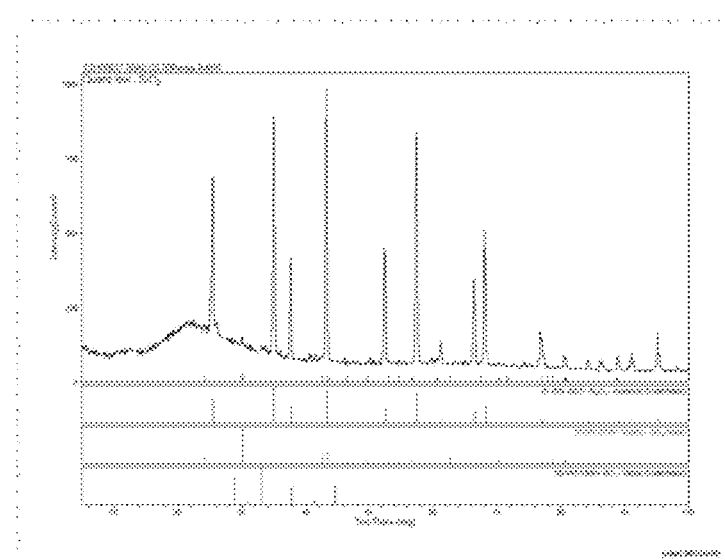
Figure 2: X-ray diffraction pattern showing alumina, perlite and nepheline syenite.

LIGHT WEIGHT PROPPANT WITH IMPROVED STRENGTH AND METHODS OF MAKING SAME

This application is a continuation of International Patent Application No. PCT/US2011/055010, filed on Oct. 6, 2011, which, in turn, claims the benefit under 35 U.S.C. §119(e) of prior U.S. Provisional Patent Application No. 61/392,508, filed Oct. 13, 2010, which is incorporated in its entirety by reference herein.

The present invention relates to methods to make strong, tough, and lightweight glass-ceramic composites. The method can involve forming a self-toughening structure generated by viscous reaction sintering of a complex mixture of oxides. The glass-ceramic preferably is strong, tough, and/or lightweight. The present invention further relates to strong, tough, and lightweight glass-ceramic composites used as proppants and for other uses including, but not limited to, armor plating, electronic, optical, high-temperature structural materials and applications, low dielectric constant substrate material in high-performance packaging applications, or window materials, for instance, for the mid-infrared range.

A variety of granular particles are used as propping agents to maintain permeability in oil and gas formations. Three grades of proppants are typically employed: sand, resin-coated sand, and ceramic proppants. Conventional proppants exhibit exceptional crush strength but also extreme density. A typical density of ceramic proppants exceeds 100 pounds per cubic foot. Proppants are materials pumped into oil or gas wells at extreme pressure in a carrier solution (typically brine) during the hydrofracturing process. Once the pumping-induced pressure is removed, proppants "prop" open fractures in the rock formation and thus preclude the fracture from closing. As a result, the amount of formation surface area exposed to the well bore is increased, enhancing recovery rates. Proppants also add mechanical strength to the formation and thus help maintain flow rates over time. Proppants are principally used in gas wells, but do find applications in oil wells.

Relevant quality parameters include: particle density (low density is desirable), crush strength and hardness, particle size (value depends on formation type), particle size distribution (tight distributions can be desirable), particle shape (spherical shape is desired), pore size (value depends on formation type and particle size, generally smaller is better), pore size distribution (tight distributions can be desirable), surface smoothness, corrosion resistance, temperature stability, and hydrophilicity (hydro-neutral to phobic is desired). Lighter specific gravity proppants can be desirable, which are easier to transport in the fracturing fluid and therefore can be carried farther into the fracture before settling out and which can yield a wider propped fracture than higher specific gravity proppants.

Proppants used in the oil and gas industry are often sand and man-made ceramics. Sand is low cost and light weight, but low strength; man-made ceramics, mainly bauxite-based ceramics or mullite based ceramics are much stronger than sand, but heavier. Ceramic proppants dominate sand and resin-coated sand on the critical dimensions of crush strength and hardness. They offer some benefit in terms of maximum achievable particle size, corrosion, and temperature capability. Extensive theoretical modeling and practical case experience suggest that conventional ceramic proppants offer compelling benefits relative to sand or resin-coated sand for most formations. Ceramic-driven flow rate and recovery improvements of 20% or more relative to conventional sand solutions are not uncommon.

Ceramic proppants were initially developed for use in deep wells (e.g., those deeper than 7,500 feet) where sand's crush strength is inadequate. In an attempt to expand their addressable market, ceramic proppant manufacturers have introduced products focused on wells of intermediate depth.

Resin-coated sands offer a number of advantages relative to conventional sand. First, resin coated sand exhibits higher crush strength than uncoated sand given that resin-coating disperses load stresses over a wider area. Second, resin-coated sands are "tacky" and thus exhibit reduced "proppant flow-back" relative to conventional sand proppants (e.g. the proppant stays in the formation better). Third, the resin coating on the sand typically increases sphericity and roundness thereby reducing flow resistance through the proppant pack.

Ceramics are typically employed in wells of intermediate to deep depth. Shallow wells typically employ sand or no proppant.

Alumina in its various forms is well known for use in proppants and other ceramic articles where high strength is required. U.S. Pat. No. 4,068,718 describes a proppant having sintered bauxite. The resulting proppant has crush strengths up to 10,000 psi and a specific gravity of about 3.4 to 3.8. High crush strength is typical of ceramics with high specific gravity. High crush strength is desirable for proppants where crush strengths ranging from 10,000 psi to over 25,000 psi are needed to prop open deep wells. Underground formations are fractured by injection of water at high pressure to break or fracture the porous rock of the formation. However, proppants must be carried into the underground formation by the flow of water or other liquids used in the fracturing process. Specific gravity is a critical parameter determining how far a proppant is carried into the fractured formation by the fracturing liquid. Proppants with specific gravity moderately greater than 1.0 and preferably between 1.5 and 2.5 are preferable. The proppant described in U.S. Pat. No. 4,068,718 provides crush strength at the expense of specific gravity.

Sintering compositions with a high alumina content, 90% by weight or greater, generally require a temperature of at least 1500° C. Temperatures lower than 1500° C. produce incomplete sintering and a loss of crush strength. In addition, incomplete sintering results in a porous particle with an open pore structure. In the case of a proppant, the open pore structure results in leakage or absorption of water into the proppant interior raising its apparent specific gravity. The addition of a second lower melting point material such as silica or perlite can lower the alumina concentration and also reduce the temperature used for complete sintering. Compositions of 60 wt % alumina by weight and 40 wt % perlite by weight still use sintering temperatures above about 1300° C. for complete sintering. For proppants that use a hollow template, such as cenospheres, to lower specific gravity, sintering temperatures above 1250° C. are not practical because of the melting point of the cenospheres. When a cenosphere is used as a template in a mixture, such as 60 wt % alumina by weight and 40 wt % perlite by weight, the sintering temperature limitation of the cenosphere template results in incomplete sintering and loss of strength.

The specific gravity of proppants can be reduced by introducing porosity into the sintered ceramic proppant. U.S. Pat. No. 3,399,727 describes a ceramic material having internal pores or cells to lower, the specific gravity of proppants while retaining sufficient crush strength to prop open the subterranean fracture. However, as well depths have increased from 10,000 feet to over 30,000 feet, the minimum required crush strength of proppants has increased from 10,000 psi to over 25,000 psi.

Perlite (sometimes spelled pearlite) is an amorphous volcanic glass that has a relatively high water content. Perlite is formed by the hydration of obsidian, a naturally occurring volcanic glass formed as an extrusive igneous rock. The typical chemical composition of perlite is $SiO_2$: 69-72%, $Al_2O_3$: 12-18%, $K_2O$: 3-4.5%, $Na_2O$: 3-4.5%, CaO: 0.1-0.2%, MgO: 0.2-0.5%, Moisture: 2-6%, where all percentages are weight percent. Perlite has the unusual property of greatly expanding when sufficiently heated. When perlite reaches temperatures of 850-900° C., it softens (since it is a glass). Water trapped in the structure of the perlite vaporises and escapes, causing an expansion of the perlite to 7-16 times its original volume. The expansion process of perlite requires rapid heating (around 900° C./min) and then removal of the particle from the heat zone. The expansion creates countless tiny bubbles leading to a very low density. Special heating approaches, such as steam or flame heating, are usually employed to achieve the required heating rate. In a typical industrial furnace with a heating rate of less than 200° C./min, the raw perlite cannot be expanded. Since perlite is a form of natural glass, it is chemically inert and has a pH around 7. Unexpanded perlite has a bulk density around 1.1 $g/cm^3$ and expanded perlite has a bulk density of about 30-150 $kg/m^3$. Expanded perlite is used in a variety of industrial applications as a filler because of its ability to expand and fill void spaces and because of its relatively low specific gravity. The majority of the applications of perlite are in building construction in the expanded form due to its low density, low thermal and acoustical conductivity, and non-flammability. Perlite can be used as a loose fill insulation in masonry construction, an aggregate in concrete, an aggregate in Portland cement or as an aggregate in gypsum plasters. Perlite is a relatively low cost material compared to other materials used in the formulation of glass-ceramic composites. The cost of perlite is approximately the same as sand. U.S. Patent Application Publication Nos. 2005/0096207; 2006/0162929; and 2006/0016598, and U.S. Pat. No. 7,160, 844 describe the use of perlite as a filler in proppants. U.S. Patent Application Publication Nos. 2006/0177661 and 2009/0038797 describe the use of perlite as a lightweight template in proppants.

U.S. Pat. Nos. 7,491,444 and 7,459,209 and other patents describe the use of a template, such as a cenoshpere, to reduce the specific gravity of a proppant. The cenosphere is coated with a green body material and then sintered to produce a spherical proppant with a hollow core. However, cenospheres melt at approximately 1250° C. and as a result, sintering temperatures must be kept below about 1200° C. This restriction can result in incomplete sintering when high strength, high melting point materials, such as alumina, are used in the green body formulation.

Proppants with a hollow center or core manufactured by spray coating of ceramic and/or glass-ceramic materials on hollow cenospheres and sintering at about 1200° C. to form a core-shell type structure are characterized by a discrete interface between the core and the shell. Although the use of a hollow glass core, such as a cenosphere and ceramic/glass-ceramic outer shell type structure, is uniquely suitable in reducing the specific gravity and moderately increasing the strength of proppants, this type of structure (discrete interface) has the disadvantage of being mechanically weak. Such structures are prone to fracture during their use where the fracture often initiates at the hollow core template. Proppant fracture increases the proportion of fine particulates in the subterranean fractures decreasing the flow of the natural gas/oil in the formation.

Fluxing agents, such as nepheline syenite, are used in the manufacture of ceramics as a vitrifying agent. Nepheline syenite can be used for the manufacture of a variety of white wares products including dinner ware, sanitary wares, floor and wall tiles, electrical porcelain, dental porcelain, porcelain balls, and mill liners. U.S. Pat. Nos. 2,898,217 and 4,183,760 describe the use of nepheline syenite in the manufacture of porcelain electrical insulators in compositions containing alumina, clay, and nepheline syenite.

SUMMARY OF THE INVENTION

A feature of the present invention is to provide a composite having a crystalline phase and an amorphous phase.

A further feature of the present invention is to provide a glass-ceramic composite having a crystalline alumina phase and an amorphous phase.

A further feature of the present invention is to provide a glass ceramic composite with a uniform dispersion of relatively small microspheres and/or pores with substantially spherical shape and a smooth interior pore surface.

A further feature of the present invention is to provide a method for making a composite having a crystalline phase and an amorphous phase, wherein the crystalline phase is preferably alumina or includes alumina.

A further feature of the present invention is to provide a method for making a glass-ceramic composite wherein the crystalline phase is in the form of (or includes) particulates embedded in a continuous amorphous phase.

A further feature of the present invention is to provide a method for making a glass-ceramic composite wherein the crystalline phase can principally be alumina in the form of particulates embedded in a continuous amorphous silica phase.

A further feature of the present invention is to provide a method for making a glass-ceramic composite wherein the crystalline phase can principally be of alumina in the form of particulates embedded in a continuous amorphous phase that can principally be perlite.

A further feature of the present invention is to provide a method for making strong, tough, and/or lightweight glass-ceramic matrix composites through a self-toughening structure generated by viscous reaction sintering of a complex mixture of oxides.

A further feature of the present invention is to provide a method for making strong, tough, and/or lightweight glass-ceramic matrix composites through a self-toughening structure generated by producing a uniform dispersion of relatively small microspheres and/or pores with substantially spherical shape and a smooth interior pore surface by liberating entrapped water or other vaporizable materials from an amorphous material during controlled viscous reaction sintering of a complex mixture of oxides.

A further feature of the present invention is to provide a method for making strong, tough, and lightweight glass-ceramic matrix composites that include a fluxing agent.

A further feature of the present invention is to provide a method for making strong, tough, and/or lightweight glass-ceramic matrix composites including a fluxing agent comprising nepheline syenite and/or similar materials.

A further feature of the present invention is an optional whisker phase in addition to the crystalline phase and the amorphous phase.

A further feature of the present invention is to provide a glass-ceramic composite, such as in the form of a proppant, with superior crush strength.

A further feature of the present invention is to provide a proppant having a superior balance of crush strength and/or buoyancy as shown by specific gravity.

A further feature of the present invention is to provide a glass-ceramic composite, such as in the form of a proppant, with superior resistance to chemical attack from acids and aqueous salt solutions.

A further feature of the present invention is to provide a glass-ceramic composite, such as in the form of a proppant, with a smooth external surface and containing microspheres and/or pores with a high degree of sphericity and a smooth surface on the interior surface of the microspheres and/or pores.

A further feature of the present invention is to provide a glass-ceramic composite, such as in the form of a proppant, with high strength, low specific gravity, and/or high chemical resistance.

A further feature of the present invention is to provide a proppant that can overcome one or more of the disadvantages described above.

To achieve one or more features of the present invention, the present invention relates to a method to produce a material, such as a composite, by forming a green body. The green body can be formed from a green body material. The green body material can include at least one metal oxide (such as a first metal oxide and a second metal oxide, wherein the first metal oxide is different from the second metal oxide). The green body further includes at least one amorphous material (different from the "at least one metal oxide") that contains entrapped water or other vaporizable materials. The at least one amorphous material may also have a specific gravity that is lower that the other green body materials contributing to lower proppant specific gravity. The method then involves sintering the green body under sintering conditions that preferably are reactive sintering conditions in order to form a material or sintered body having at least one crystalline phase and at least one amorphous phase. A fluxing agent can be provided to enhance liquid phase sintering of the green body material promoting intimate contact between the crystalline and amorphous phases of the proppant. The method further involves controlling the sintering process to liberate water or other materials entrapped in an amorphous material in a controlled manner such that the liberated gas forms a relatively small number of substantially uniformly distributed microspheres and/or pores having substantially spherical shape in the sintered body.

As an example, the method for producing a self-toughened high-strength glass-ceramic composite can include forming a green body from a green body material. The green body material can include:
  a) alumina and/or at least one alumina precursor, and
  b) perlite and/or at least one amorphous material containing at least one entrapped vaporizable material, such as water, and
  c) at least one fluxing agent, such as nepheline syenite, and/or similar materials, wherein a), b), and c) are different from each other.

The method includes sintering the green body under sintering conditions to form a glass-ceramic composite with at least one crystalline phase and at least one amorphous phase. The method further includes controlling the sintering conditions such that the water in the perlite or the vaporizable material in an amorphous material is liberated to form a relatively small number of substantially uniformly distributed microspheres and/or pores having substantially spherical shape in the sintered body.

The method further includes controlling sintering conditions such that the nepheline syenite and/or other fluxing agent results in liquid phase sintering and intimate contact between the resulting crystalline phase and amorphous phase.

The inventors unexpectedly have found that the combination of a fluxing agent such as nepheline syenite and perlite results in a toughened perlite-glass matrix imparting additional strength to the proppant by sintering the green body material, for instance, at a temperature of about 1200° C., or other suitable sintering temperatures.

The present invention further relates to materials, composites, or particles of the present invention. The material of the present invention has at least one crystalline phase and at least one amorphous phase. Preferably, the amorphous material, such as perlite, has a lower specific gravity than the other materials in the green body material. The material of the present invention includes a relatively small number of substantially uniformly distributed microspheres and/or pores having substantially spherical shape in the sintered body.

The present invention provides a new and improved propping agent, and a method of making and use, that overcomes the above-referenced problems and others. The present invention relates to a ceramic proppant having a unique microstructure that includes a crystalline phase intimately embedded in an amorphous phase and having reduced density, and/or improved strength. The intimate contact between the crystalline phase and amorphous phase provide high strength and toughness. The microstructure can also include anisotropic crystals, for example, crystals elongated along the C-axis. The proppant can have a reduced density such that the proppant has a low specific gravity while optionally maintaining improved mechanical and/or flexural strength. The present invention provides a proppant having substantially spherical shape and a smooth exterior surface. The present invention includes a relatively small number of substantially uniformly distributed microspheres and/or pores, which can be of substantially spherical shape in the sintered body, where such microspheres and/or pores can contribute to reducing the density of the proppant with minimal loss of strength. The small size, uniform distribution, and substantially spherical shape of the microspheres and/or pores contribute to improved toughness, strength, and/or crush resistance of the proppant. The present invention provides a proppant with improved resistance to chemical attack from acids and aqueous salt solutions.

The present invention further relates to a method of producing a ceramic proppant that employs a reactive sintering process to form a crystalline phase in intimate contact with an amorphous phase through the chemical reaction of raw materials and to form a relatively small number of substantially uniformly distributed pores having substantially spherical shape in the ceramic proppant through the use of controlled sintering of amorphous materials having inclusions of a vaporizable material. Pores may optionally be produced through the use of pore formers that form pores through chemical reaction and/or thermal decomposition to form a gas. The method allows the porosity, such as pore size, pore size distribution, and/or pore shape, of the proppant to be controlled. Alterations to the porosity can have a large impact on reducing the specific gravity while maintaining mechanical and/or flexural strength.

The proppant can be used in any applications suitable for a proppant. The present invention accordingly relates to a method to prop open subterranean formation fractions using the proppant.

BRIEF DESCRIPTION OF DRAWINGS

FIG. 1 is a schematic showing the structure of one example of a proppant with a hollow template.

FIG. 2 is the X-ray diffraction pattern from a sintered proppant.

DETAILED DESCRIPTION OF THE PRESENT INVENTION

The present invention relates to a material (e.g., particles, agglomerates, an article, and the like) that includes at least one crystalline phase and at least one amorphous phase. The material can be a sintered body or considered a sintered material or sintered body or sintered composite. The material can be a composite of two or more materials, which, in this case, would be at least the crystalline phase and an amorphous matrix phase present in the same material. The material can have an intimate interface between the crystalline phase and the amorphous phase, such as throughout the material including the inner composite material and the surface, or in isolated or controlled regions or locations of the material. Optionally, the amorphous phase may contain microspheres and/or pores with a smooth interior surface that are present in the amorphous phase. The matrix can include other components or ingredients as mentioned herein. The matrix is preferably amorphous or includes an amorphous phase.

For purposes of the present invention, the material of the present invention will be described in terms of its preferred form or shape, namely particles that can be used in a variety of end use applications, such as for proppant uses in hydrocarbon recovery. While the preferred shape and preferred materials of the present invention are described in detail below, it is to be understood that this is simply for exemplary purposes and in no way limits the scope of the present invention with respect to shape, materials, and/or end uses. While the term "proppant" is used at times in the application, it is understood that this term is not meant to be limited to its end use application, but for purposes of the present invention, it is to be understood that the proppant or particles, which are used as proppants, can be used in any end use application where ceramic material is useful.

The material or particles of the present invention can be characterized as composites and these composites can be glass-ceramic composites due to the glassy phase or glassy components present in the composite and due to the ceramic phase or ceramic components present in the composite.

The glassy matrix may also contain small microspheres and/or pores that can be uniformly distributed in the amorphous phase. The microspheres and/or pores can be spherical and/or possess a smooth interior surface. The exterior surface of the material or particles can have a smooth and continuous exterior surface.

In more detail, the material of the present invention can include from about 20% by weight to about 70% by weight (based on the weight of the material) of the matrix or amorphous phase, such as from about 30 wt % to 60 wt %, from about 35 wt % to 55 wt %, from about 40 wt % to 60 wt %. The matrix or amorphous phase can include a silicon-containing oxide (e.g., silica), and optionally at least one iron oxide; optionally at least one potassium oxide; optionally at least one calcium oxide; optionally at least one sodium oxide; optionally at least one titanium oxide; and/or optionally at least one magnesium oxide, or any combinations thereof. Preferably, the matrix or amorphous phase contains each of these optional oxides in various amounts where, preferably, the silicon-containing oxide is the major component by weight in the matrix or amorphous phase, such as where the silicon-containing oxide is present in an amount of at least 75% by weight, at least 85% by weight, at least 90% by weight, at least 95% by weight, at least 97% by weight, at least 98% by weight, at least 99% by weight (such as from 75% by weight to 99% by weight, from 90% by weight to 95% by weight, from 90% by weight to 97% by weight) based on the weight of the matrix or amorphous phase. Exemplary oxides that can be present in the amorphous phase include, but are not limited to, $SiO_2$, $Al_2O_3$, $Fe_2O_3$, $Fe_3O_4$, $K_2O$, $CaO$, $Na_2O$, $TiO_2$, and/or $MgO$. It is to be understood that, for purposes of the present invention, other metals and/or metal oxides can be present in the matrix or amorphous phase.

The material includes at least one amorphous material that contains an entrapped vaporizable material such as water. Preferably, the amorphous material that contains an entrapped vaporizable material has a lower specific gravity than the other green body materials. Examples of the amorphous material include perlite, stober silica, pumice, andesite, scoria, volcanic glasses, or any combination thereof. Preferably, the amorphous material that contains an entrapped vaporizable material such as water is present by weight in the matrix or amorphous phase in an amount of at least 5% by weight, at least 10% by weight, at least 15% by weight, at least 20% by weight, at least 25% by weight, at least 30% by weight, at least 35% by weight, at least 40% by weight, such as from 5% by weight to 40% by weight, from 10% by weight to 35% by weight, or from 15% by weight to 25% by weight. The entrapped vaporizable material may comprise vaporizable water ($H_2O$), carbon dioxide ($CO_2$), sulfur dioxide ($SO_2$), hydrogen sulfide ($H_2S$), nitrogen, argon, helium, neon, methane, carbon monoxide (CO), hydrogen, oxygen, hydrogen chloride (HCl), hydrogen fluoride (HF), hydrogen bromide (HBr), nitrogen oxide (NOx), sulfur hexafluoride ($SF_6$), carbonyl sulfide (COS), volcanic gases, or any combinations thereof. With regard to the entrapped vaporizable material present in the at least one amorphous material that forms part of the green body material, a residual amount of the entrapped vaporizable can be present in the proppant once the sintered proppant is formed.

In the present invention, the matrix or amorphous phase can be a continuous phase present in the material of the present invention.

As an option, one or more carbides, such as SiC and/or other forms can be present in the material (e.g., sintered body). The carbide can be present as particles, particulates, and/or fibers and/or whiskers. As an option, the carbide in part, or in its entirety, is not used as a pore former, but is used as a particulate or fiber or whisker that remains as part of the material (e.g. sintered body). This can be achieved, for instance, by sintering in an inert atmosphere (and not an oxygen containing atmosphere). This controlled sintering avoids the carbide reacting and forming a gas bubble. The carbide in this form can be present in any amount, such as from about 0.01% by weight to 25% by weight or more, based on the weight of the material (e.g. sintered body).

The range of SiC particle size used in the green body material can have effects on both microsphere placement and/or size and strength enhancement in the composite proppant product. The SiC and/or other carbide powder used in the green body material should have a small size with a large enough surface area to allow the oxidation to proceed as desired. SiC particles can have a particle size distribution with $d_{fs}$ of from about 0.5 to about 5.0 or from about 0.5 to about 1.5, wherein, $d_{fs} = \{(d_{f90} - d_{f10})/d_{f50}\}$ wherein $d_{f10}$ is a particle size wherein 10% of the particles have a smaller particle size, $d_{f50}$ is a median particle size wherein 50% of the particles have a smaller particle size, and $d_{f90}$ is a particle size wherein 90% of the particles have a smaller particle size. Unless stated otherwise, all percents herein and throughout the present application for particle size distributions are percent by volume. The median particle size, $d_{f50}$, of the SiC is from about 0.01 μm to about 100 μm or from about 0.2 μm to about 5 μm, wherein $d_{f50}$ is a median particle size where 50% of the particles of the distribution have a smaller particle size. The SiC can comprise from about 0.01 to about 50 wt % of the green body or from about 0.01 to about 10 wt % of the green body. The silicon carbide can have a surface area (BET) of from about 0.5 m$^2$/g to about 100 m$^2$/g or from about 8 m$^2$/g to about 15 m$^2$/g. These properties can remain in the sintered body as well or be within 10% or within 20% or within 40% of these parameters.

In the present invention, the material (e.g., sintered body) can be a solid material (i.e., no template or no hollow template in the interior) or the material can have such a template. FIG. 1 shows such a proppant with a template comprising an inner shell and an outer shell and having radii, $R_1$, $R_2$, and $R_3$. The material can be porous or non-porous. The material can have microspheres (pre-formed and/or in situ formed) as an option.

As an option, the matrix or amorphous phase can have no pores. As an option, the matrix or amorphous phase can be porous.

An optional whisker phase can be present in addition to the crystalline phase and the amorphous phase. The optional whisker phase may be present in a whisker containing material, such as mullite whiskers, present in ground cenospheres. With regard to the whiskers, the whiskers can be in the form of needles and/or other shapes. The whiskers can be mineral-based and/or metal oxide-based whiskers and/or can be considered whiskers formed of one or more minerals and/or metal oxides. Preferably, the whiskers are or include mullite whiskers (e.g., needle-shaped mullites). The whiskers can be silicate mineral whiskers or whiskers made of one or more silicate minerals. Preferably, the optional whiskers can have diameters of from 0.05 micron to about 2 microns (e.g., from 0.05 micron to 2 microns, 0.05 micron to 1.5 microns, 0.05 micron to 1 micron, 0.1 micron to 1 micron, 0.5 micron to 1 micron, 0.75 micron to 1.5 microns). The whiskers can have an aspect ratio of from about 10 to about 100 (e.g., from 10 to 75, from 15 to 100, from 20 to 100, from 10 to 45, from 15 to 40, from 20 to 35). The whiskers can have a length of from about 1 micron to about 50 microns (e.g., from 1 micron to 40 microns, from 1 micron to 30 microns, from 1 micron to 20 microns, from 1 micron to 10 microns, from 1 micron to 5 microns, from 5 microns to 50 microns, from 10 microns to 50 microns, from 15 microns to 50 microns, from 20 microns to 50 microns, from 25 microns to 50 microns, and the like). It is to be understood that the whiskers can be a combination of various diameters, and/or various aspect ratios, and/or various lengths. It is to be understood that the whiskers can have relatively consistent diameters with varying aspect ratios and/or varying lengths. The whiskers can have relatively consistent aspect ratios and varying diameters and/or varying lengths. The whiskers can have relatively consistent lengths and varying diameters and/or varying aspect ratios. With respect to consistent diameters and/or consistent aspect ratios and/or consistent lengths, it is to be understood, for purposes of the present invention, that consistent refers to diameters, aspect ratios, and/or lengths that are within 25%, or within 10%, or within 5%, or within 1% of the other diameters and/or other aspect ratios, and/or other lengths of the whiskers. The various ranges for the diameters, aspect ratios, and/or lengths, for purposes of the present invention, can be considered average diameters, average aspect ratios, and/or average lengths. As an option, these ranges can be considered maximum values for the diameters, and/or aspect ratios, and/or lengths.

The whiskers can be present in the material of the present invention in various amounts. For instance, the concentration of the whiskers can be present in an amount of from 0.1 wt % to 60 wt % based on the weight of the material Preferably, the concentration of the whiskers is present in an amount of from about 10 wt % to about 50% (such as from 15% to 45 wt %, 20 wt % to 45 wt %, 30 wt % to 45 wt %, 30 wt % to 40, and the like), based on the weight of the material.

The whiskers can be uniformly distributed throughout the material (e.g., uniform concentration) of the present invention. The whiskers can be considered a continuous phase or can be considered a whisker phase in the material of the present invention. The reference to continuous phase is a reference to whiskers that can, as an option, be present in such an amount that the whiskers contact or touch each other (in two or three dimensions throughout the material) and, therefore, form a continuous phase throughout the material of the present invention. The concentration of the whiskers can be the same throughout the material or can be different, such as in the form of gradients, wherein one region of the material can have a higher concentration of whiskers compared to another region, such as a surface region versus a non-surface region. The whiskers can, as an option, be limited to a template core/shell interface and/or template, if a template is used. The whiskers, as an option, can be limited to the center region of the proppant, for instance, at least 50% or more from the exposed outer surface, wherein the percent is a percent of the overall radius of the proppant, such as 60% to 100%, 70% to 95%, 80% to 90% from the exposed outer surface of the proppant.

The whiskers can be present in a random manner throughout the matrix or amorphous phase of the material of the present invention. The whiskers can be considered to be in a random alignment in the material of the present invention.

The material of the present invention can be in the form of a sphere, where this sphere is solid or hollow, or has one or more voids present within the sphere. The material can be a sphere or similar shape, which is hollow, has voids, or is a solid in the interior of the sphere.

As an option, the material of the present invention can form a shell around one or more other materials, such as a template or template material, which can be in the form of a sphere or other shape and which can be a solid material or a hollow material. For instance, the material of the present invention can form a shell around a hollow sphere, such as a cenosphere or other similar material. When the material of the present invention is present as a shell and encapsulates one or more other materials, such as a sphere (like a hollow sphere), the coefficient of thermal expansion between the shell and the template material can be the same or within 20% of each other, such as within 10%, within 5%, within 1%, or within 0.5% of each other.

As an option, the present invention relates to a particle or proppant having a template material and shell on the template material, wherein the shell (in one or more layers) at least includes or is the material of the present invention as described herein. The template material (for instance, a hollow sphere, such as a cenosphere) can have the same components as the shell from the standpoint of having a matrix or amorphous phase that optionally has whiskers or a whisker phase present. For purposes of the present invention, it is to be understood that the template material can have the same or different composition and/or characteristics as the shell with respect to the components present and/or amount of each component.

The proppant (or sintered body) can have a hollow core or a solid core, and can have a low specific gravity, for example, a specific gravity in a range of from about 1.0 g/cc to about 2.8 g/cc, while maintaining a crush strength in a range of from about 500 psi to about 20,000 psi, and/or a flexural strength in a range of from about 1 MPa to about 200 MPa, or more.

The proppants of the present invention can provide oil and gas producers with one or more of the following benefits: improved flow rates, enhanced hydrocarbon recovery, improved productive life of wells, improved ability to design hydraulic fractures, and/or reduced environmental impact. The proppants of the present invention are designed to improve flow rates, eliminating or materially reducing the use of permeability destroying polymer gels, reducing pressure drop through the proppant pack, and/or reducing the amount of water trapped between proppants thereby increasing hydrocarbon "flow area." Lower density enhances proppant transport deep into the formation, increasing the amount of fracture-area propped, and thereby increasing the mechanical strength of the reservoir. The low density of the present invention's proppants can reduce transportation costs. Because the proppant is lighter, less pumping force is needed, potentially lowering production costs and reducing damage to the formation.

Proppants of the present invention preferably enable the use of simpler completion fluids and less (or slower) destructive pumping. Formations packed with lower density proppants of the present invention can exhibit improved mechanical strength/permeability and thus increased economic life. Enhanced proppant transport enabled by lower density proppants enable the emplacement of the proppant of the present invention in areas that were previously impossible, or at least very difficult to prop. As a result, the mechanical strength of the subterranean formations can be improved with reduced decline rates over time.

If lower density proppants are employed, water and/or brine solutions can be used in place of more exotic completion fluids. The use of simpler completion fluids can reduce or eliminate the need to employ de-crosslinking agents. Further, increased use of environmentally friendly proppants can reduce the need to employ other environmentally damaging completion techniques such as flashing formations with hydrochloric acid. The low density properties that can be exhibited by the proppants of the present invention eliminates or greatly reduces the need to employ permeability destroying polymer gels as the proppants are more capable of staying in suspension.

As an option, the present invention relates to low density proppants that can be utilized, for example, with water and/or brine carrier solutions.

The proppant can be either solid throughout or hollow within the proppant. In the present invention, a solid proppant is defined as an object that does not contain a void space in the center, although a porous material would be suitable and is optional; a fully dense material is not a requirement of solid proppant. A hollow material is defined as an object that has at least one void space inside (e.g., generally centrally located within the proppant) with a defined size and shape.

The material of the present invention can have isotropic properties and/or anisotropic properties. In other words, the ceramic material can have measurable properties that are identical in all directions (isotropic), but can also have properties that differ according to the direction of measurement (anisotropic).

The template preferably can have a diameter in the size range of, for example, from about 1 nm to about 3000 µm, or from about 25 µm to about 2000 µm, or from about 80 µm to about 1500 µm, or 100 µm to 1000 µm, or from about 120 µm to about 300 µm.

The proppants of the present application can have a specific gravity of, for example, from about 0.6 g/cc to about 3.2 g/cc. The specific gravity can be, for example, from about 1.0 g/cc to about 3.2 g/cc, from about 1.0 g/cc to about 2.8 g/cc, from about 1.0 g/cc to about 2.5 g/cc, from about 1.0 g/cc to about 2.2 g/cc, from about 1.0 g/cc to about 2.0 g/cc, from about 1.0 to about 1.8 g/cc, or from about 0.8 g/cc to about 1.6 g/cc. Other specific gravities above and below these ranges can be obtained. The term "specific gravity" as used herein is the weight in grams per cubic centimeter (g/cc) of volume, excluding open porosity in determining the volume. The specific gravity value can be determined by any suitable method known in the art, such as by liquid (e.g., water or alcohol) displacement or with an air pycnometer.

The strength properties of the proppant can be dependent on the application. The crush strength can be at least 100 psi, such as from about 2,000 psi to about 30,000 psi or higher, or from about 5,000 psi to 25,000 psi, or from 7,000 psi to 20,000 psi. The crush strengths can be greater than 9,000 psi, greater than 15,000 psi, or greater than 30,000 psi. Other crush strengths below or above these ranges are possible. A crush strength below 3000 psi is an option, such as 500 psi to 3000 psi, or 1000 psi to 2,000 psi. Crush strength can be measured, for example, according to American Petroleum Institute Recommended Practice 60 (RP 60).

The proppant can have any particle size. For instance, the proppant can have a particle diameter of from about 1 nm to 1 cm, from about 1 µm to about 1 mm, from about 10 µm to about 10 mm, from about 100 µm to about 5 mm, from about 50 µm to about 2 mm, or from about 80 µm to about 1,500 µm, from about 100 µM to 2,000 µm, and the like. The optimum size of the proppant can depend on the particular application.

The clay or clays used can be in uncalcined, partially calcined, or calcined forms, or any mixtures of such forms. The term "uncalcined clay" is understood by those of ordinary skill in the art to mean clay in its natural "as-mined" condition. Uncalcined clay has not been subjected to any type of treatment that would result in a chemical or mineralogical change, and can also be referred to as "raw" clay. The terms "partially calcined clay" and "calcined clay" are understood by those of ordinary skill in the art to mean clay that has been subjected to a heat treatment at times and temperatures, typically about 500° C. to 800° C., to remove some (partially calcined) or substantially all (calcined) organic material and water of hydration from the clay.

The present invention also relates to a proppant used to prop open subterranean formation fractions comprising at least a particle or particles of the present invention with controlled buoyancy and/or crush strength. The controlled buoyancy can be a negative buoyancy, a neutral buoyancy, or a positive buoyancy in the medium chosen for pumping the proppant to its desired location in the subterranean formation. The medium chosen for pumping the proppant can be any desired medium capable of transporting the proppant to its desired location including, but not limited to, a gas and/or liquid, energized fluid, foam, and aqueous solutions, such as water, brine solutions, and/or synthetic solutions. Any of the proppants of the present invention can have a crush strength sufficient for serving as a proppant to prop open subterranean formation fractures.

The proppants of the present invention can comprise a single particle or multiple particles and can be a solid, partially hollow, or completely hollow in the interior of the particle. The particle can be spherical, nearly spherical, oblong (or any combination thereof), or have other shapes suitable for purposes of being a proppant. The proppant may contain optional filler in addition to optional whiskers. The filler is a compound that does not reactively sinter with the ceramic material. Examples of fillers include graphite, metals (e.g., noble metals), metal oxides (e.g., cerium oxide), and/or metal sulfides (e.g., molybdenum disulfide).

The proppant of the present invention can be a sintered body, such as a sphere having a Krumbein sphericity of at least about 0.5 and a roundness of at least about 0.4. The proppant can include a) a plurality of optional ceramic whiskers or oxides thereof and b) a glassy phase and c) at least one non-whisker crystalline phase and d) optionally a plurality of microspheres, wherein the sintered sphere has a diameter of from about 90 microns to 2,500 microns, and the sintered sphere has a specific gravity of from 0.8 g/cc to about 3.8 g/cc, and the proppant has a crush strength of about 1,000 psi or greater.

The proppants described herein, of the present invention can include one or more of the following characteristics:

1) said glassy phase is present in an amount of at least 10% by weight, based on the weight of the proppant (e.g., at least 15%, at least 20%, at least 25%, at least 30%, at least 40%, at least 50%, such as from 15% to 70%, all based on wt %, based on the weight of the proppant);

2) said proppant having a porosity from about 1% to 70% by weight where $$\text{porosity (\%)} = 100 - \left(\frac{SG_m}{SG_t}\right) \times 100 \text{ and}$$

$SG_m$=measured specific gravity and
$SG_t$=theoretical specific gravity;

3) said proppant having a porosity from about 5% to 50% by weight;

4) said proppant having a porosity from about 3% to 20% by weight;

5) said proppant having a porosity from about 4% to 16% by weight;

6) said proppant having a specific gravity of from 1.6 to 1.8 with a crush strength of at least 2000 psi;

7) said proppant having a specific gravity of from 1.8 to 2 with a crush strength of at least 3000 psi;

8) said proppant having a specific gravity of from 2 to 2.1 with a crush strength of at least 5,000 psi;

9) said proppant having a specific gravity of from 2.25 to 2.35 with a crush strength of at least 8,000 psi;

10) said proppant having a specific gravity of from 2.5 to 3.2 with a crush strength of at least 18,000 psi;

11) said proppant having a specific gravity of from 2.5 to 3.2 with a crush strength of at least 25,000 psi or at least 30,000 psi;

12) said proppant having a combined clay amount and cristobalite amount of less than 20% by weight of proppant;

13) said proppant having a free alpha-alumina content of at least 5% by weight of said proppant (e.g., 5 wt % to 70 wt % or more, at least 10 wt %, at least 20 wt %, at least 30 wt %, at least 40 wt %, based on the weight of the proppant);

14) said proppant having an HF etching weight loss of less than 35% by weight of said proppant (e.g., less than 30% by weight, less than 25% by weight, less than 20% by weight, less than 15% by weight, less than 10% by weight, such as from 10 wt % to 34 wt %, from 15 wt % to 30 wt %, from 18 wt % to 28 wt % by weight of said proppant);

15) said proppant having said microspheres present as hollow glass microspheres having a particle size distribution, $d_{as}$, of from about 0.5 to about 2.7 (e.g., 0.5 to 2.6, 0.8 to 2.2, 1 to 2, 0.5 to 2, 0.5 to. 1.5, 0.5 to 1), wherein, $d_{as}=\{(d_{90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size;

16) said proppant having microspheres present wherein said microspheres are uniformly present in said proppant or in a layered region of said proppant;

17) said optional ceramic whiskers have an average length of less than 5 microns (e.g., less than 4 microns, less than 3.5 microns, less than 3.2 microns, less than 3 microns, less than 2.7 microns, less than 2.5 microns, less than 2.2 microns, such as from 0.5 micron to 5 microns, or from 1 micron to 3.5 microns, or from 0.8 micron to 3.2 microns, or from 1 micron to 3 microns or from 1.2 to 1.8 microns);

18) said optional ceramic whisker have an average width of less than 0.35 micron (e.g., less than 0.3, less than 0.28, less than 0.25, less than 0.2, less than 0.15, such as from 0.05 to 0.34 micron, from 0.2 to 0.33 micron, from 0.1 to 0.3 micron, from 0.12 to 0.2 micron, all units in microns);

19) said optional ceramic whiskers have a whisker length distribution, $d_{as}$, of about 8 or less (e.g., 7 or less, 6 or less, 5 or less, 4 or less, 3 or less, 2 or less, 1 or less, 0.5 or less, 0.4 or less, 0.3 or less, 0.2 or less, such as 0.1 to 8, 0.1 to 7, 0.1 to 6, 0.1 to 5, 0.1 to 4, 0.1 to 3, 0.1 to 2, 0.1 to 1, 0.1 to 0.75, 0.1 to 0.5, 0.1 to 0.3, 0.1 to 0.2, 0.1 to 1.8), wherein, $d_{as}=\{(d_{a90}-d_{a10})/d_{a50}\}$ wherein $d_{a10}$ is a whisker length wherein 10% of the whiskers have a smaller length, $d_{a50}$ is a median whisker length wherein 50% of the whiskers have a smaller whisker length, and $d_{a90}$ is a whisker length wherein 90% of the whiskers have a smaller whisker length;

20) said optional ceramic whiskers are present in an amount of from 5% to 60% by weight of said proppant (e.g., from 5% to 50%, from 5% to 45%, from 5% to 40%, from 5% to 35%, from 5% to 30%, from 5% to 25%, from 5% to 20%, from 5% to 15%, from 10% to 25%, from 15% to 25%, all by wt % based on the weight of said proppant);

21) said proppant has a combined clay amount and cristobalite amount of less than 20% (e.g., less 15%, less than 10%, less than 5%, less than 1%, such as from 0.1% to 3%, all wt %) by weight of proppant and/or said mullite whiskers are present in an amount of 60% or more by weight of said proppant (e.g., from 5% to 50%, from 5% to 45%, from 5% to 40%, from 5% to 35%, from 5% to 30%, from 5% to 25%, from 5% to 20%, from 5% to 15%, from 10% to 25%, from 15% to 25%, all by wt % based on the weight of said proppant);

22) said proppant has a uniform composition comprised of both crystalline and amorphous materials that extend from the inner portions of the proppant out through the surface.

23) said whiskers in said proppant are less euhedral and more anhedral;

It is to be understood that all averages and distributions mentioned above are based on measuring at least 50 whiskers picked on a random basis in a proppant. Preferably, at least 10 proppants are measured in this manner and an average obtained.

In the present invention, the one or more of said characteristics mentioned above provide stress reducing properties on the proppant compared to the same proppant but without said characteristics. The proppant can have an alumina content of at least 35% by weight of said proppant, such as at least 40%, at least 45%, at least 50%, at least 55%, at least 90, such as from 50% to 70%, all wt % based on the weight of the proppant. The proppant can have an perlite content of at least 15% by weight of said proppant, such as at least 20%, at least 25%, at least 30%, at least 45%, at least 50%, such as from 15% to 30%, all wt % based on the weight of the proppant. The green body or proppant can have a fluxing agent (e.g., an nepheline syenite) content of at least 5% by weight of said proppant, such as at least 10%, at least 15%, at least 20%, at least 25%, at least 30%, such as from 10% to 20%, all wt % based on the weight of the proppant. The proppant can include quartz. The proppant can have quartz in an amount of from 0.1 wt % to 1 wt % based on the weight of the proppant. The proppant can have at least one layered shell encapsulating a hollow spherical template. The proppant can have at least one layered shell encapsulating a hollow spherical template, and the microspheres (e.g., in-situ formed and/or pre-formed) are present in the at least one layered shell. The proppant can optionally have mullite whiskers, such as present in an amount of from 10 wt % to 40 wt % by weight of said proppant (e.g., 15 wt % to 30 wt %, or 20 wt % to 25 wt % and the like).

In the present invention, the fluxing agent, such as the nepheline syenite, has the ability to flux the components that form the sintered proppant of the present invention under firing conditions of about 1,000° C. or higher. The fluxing agent, as present in the green material that forms the green body, increases the mobility of the materials that form the green body, which consequently forms lower melting eutectics at high temperature and thereby helps the sintering of the material to form the proppants of the present invention. When the green body is formed from packing of the material that forms the green body, porosity or interstitial spacing can occur from particle packing, and these spaces can lead to pores during the sintering process. During the sintering process, if the material is under-fired or not fully sintered, this porosity can be especially problematic because the sintered proppant will then have a greater tendency to absorb or otherwise takes in water or aqueous fluids when the proppant is dispersed in water. The fluxing agent, added as a bulk component, has the ability to reduce in a significant way and/or eliminate these types of pores that form and, therefore, the proppants of the present invention, by using one or more fluxing agents, has the ability to significantly reduce the amount of water or aqueous fluid that is absorbed or otherwise taken into the proppant. This can be measured to show that the proppants of the present invention, which contain and were made with at least one fluxing agent, have significantly reduced water intake. Further, these interstitial spaces or pores forming due to spaces that occurred during particle packing can be viewed as defects because when the proppant is mechanically stressed, cracks can develop or propagate at the pores or through the pores. Thus, the number of pores and their interconnectivity and the size of the pores can affect the overall mechanical performance of the proppant. The use of one or more fluxing agents as described herein permits the sintering to occur at a lower temperature, but also permits the ability to reduce or eliminate these types of pores. These pores that can influence and/or cause the amount of water that enters a proppant are especially the surface pores and pores that are interconnected. With the use of one or more fluxing agents as described herein, the sintered proppant of the present invention has reduced and/or no surface porosity and/or interconnected porosity.

Further, the sintered proppants of the present invention can be measured with regard to the water intake and this can be measured by taking a proppant and measuring the bulk density and then calculating the specific gravity of the proppant assuming the proppant is spherical. The proppant's specific gravity is then measured by soaking the proppant in water until no air bubbles are evolving. If the measured specific gravity and the calculated specific gravity are the same, this would mean that the proppant did not take in any water. On the other hand, if the proppant has a different specific gravity and, specifically, a higher specific gravity, this would mean that the proppant did take in water and, therefore, has undesirable surface porosity and possibly interconnecting pores. With the present invention, the sintered proppants can have a specific gravity difference ($SG_{measured} - SG_{calculated}$) of 0 to 0.1 and can be 0 to 0.05, or 0 to 0.03, or 0 to 0.1, or 0 to 0.005.

With regard to the use of one or more fluxing agents, the fluxing agents can be nepheline syenite, feldspar, synthetic clay, natural clay, or any combinations thereof. Examples of other fluxing agents that can be used or present include silica-undersaturated and/or peralkaline igneous rocks (e.g., foyaites, K-feldspar-nepheline syenites, such as ones containing <10% ferromagnesian minerals, like pyroxene, hornblende, and/or biotite, laurdalites, laurvikites, ditroites, a microcline, sodalite and/or cancrinite variety of nepheline syenite. The fluxing agent can contain anorthoclase feldspars, biotite, greenish augite, apatite, olivine, orthoclase, nepheline, biotite, aegirine, acmite and/or any combinations thereof. The nepheline-syenites can be rich in alkalis and in alumina (hence the abundance of felspathoids and alkali feldspars) with silica varying from 50 to 56% by weight. The fluxing agent can (by wt % of the fluxing agent) have or contain the following oxides:

$SiO_2$—54.99 wt %
$TiO_2$—0.60 wt %
$Al_2O_3$—20.96 wt %
$Fe_2O_3$—2.25 wt %
FeO—2.05 wt %
MnO—0.15 wt %
MgO—0.77 wt %
CaO—2.31 wt %
$Na_2O$—8.23 wt %
$K_2O$—5.58 wt %
$H_2O$—1.47 wt %
$P_2O_5$—0.13 wt %

In the above breakdown of oxides, the weight percents provided can vary ±20 wt % for any one or more of the oxides and any one or more of the oxides under 5 wt % can be optionally not present or be essentially below 100 ppm in amount. The fluxing agent can contain from about 15 wt % to 30 wt % (e.g. about 22 wt %) nepheline and from about 50 wt % to about 75 wt % (e.g., about 66 wt %) feldspar.

The fluxing agent(s) can be present in the sintered proppant as part of the final product. The amount of the fluxing agent present in the proppant is as described earlier, namely, at least 5% by weight, such as from about 5% to 30% based on the weight of the proppant. The fluxing agent can form part of the amorphous phase and/or crystalline phase.

The present invention also relates to a method of preparing a proppant that employs reactive or reaction sintering to form a unique microstructure, in which a crystalline phase is intimately embedded in an amorphous phase. The raw materials can comprise ceramic precursors, for example, talc, clay, alumina, perlite, silica, kyanite, or any combination thereof. The raw materials can include a fluxing agent such as nepheline syenite, feldspar, synthetic clay, natural clay, or any combination thereof which is used to promote sintering and can promote a particulate crystalline phase intimately embedded in the amorphous phase.

The method can produce a ceramic proppant comprising anisotropic crystals. The flexural strength of such a proppant can have, for example, at least 50% more strength than a proppant with isotropic structure that can be formed by sintering pre-formed materials, at the same or about the same specific gravity. The reactive or reaction sintering preferably forms substantially spherical microspheres or pores with a smooth glassy interior wall inside the amorphous phase by controlled release of gaseous materials, such as water, from the at least one amorphous material that contains an entrapped vaporizable material, such as water. The reactive or reaction sintering process in the presence of the fluxing agent and the amorphous material that contains an entrapped vaporizable material such as water, promotes a uniform distribution of a crystalline particle phase in an amorphous phase in which the uniform distribution extends from the interior of the proppant through to the surface of the proppant. The amorphous material that contains an entrapped vaporizable material such as water can comprise perlite, stober silica, pumice, andesite, scoria, volcanic glasses or any combination thereof.

In present invention, the ceramic particles or any type of proppant particle can benefit from using membrane separation processes for one or more of the starting materials that are used to form the ceramic particles or any type of proppant. The membrane separation processes can be also useful in the final product as well.

The particle size and/or its distribution of any or all of the starting materials can be strictly controlled by one or more membrane separation processes. The selected incoming raw materials can be dispersed into a slurry, such as an aqueous slurry like water. At least one dispersant can be used as well for improving the dispersion of the slurry. The slurry can be milled, such as through an attrition mill, ball mill, jet mill, hammer mill, or any combination thereof. After milling or otherwise obtaining the desired general particle size, the slurry can be diluted to a desirable concentration, then feed into at least one membrane filtration device. By such a process, the larger particles are left in the filtration cake or in the retained slurry while the smaller particles remain in the effluent slurry. With such a process, the larger particles are filtered out. The effluent slurry can be then feed in to a second membrane filter with a smaller pore size. Going through the same process as described above, the filtration cake or the retained slurry having a narrow particle size distribution of raw materials is obtained. Essentially this membrane process permits a very accurate and controlled way to obtain a "cut" of desirable particle sizes, whereby the unwanted smaller particles and the unwanted larger particles are removed.

In the present invention, one can use the above membrane filtration process to separate particle sizes into various groups, such as with an average particle size of 0.2 micron, 0.5 micron, 1 micron, 1.5 micron, and 2.0 microns, and so on, depending on the membrane pore size. The width of the size distribution can be determined by the two "cuts" of membrane sizes. In general, a much narrower size distribution is desirable for product performance and this process permits such a distribution. In addition to membrane filtration, air classification can be employed alone or in combination with membrane separation to produce the desired mean particle size and size distribution.

As an example, raw material particles with the same particle size distributions can be mixed, and then spray coated to form ceramic green spheres, or granulated in a granulator. Due to the same particle sizes, particle packing is well controlled. Pores between particles can be well preserved. During the firing process, particles sinter together, and the porosity can be well preserved after the firing process, with a narrow pore size distribution. By controlling the particle size with the narrow distribution, a pore size can be well controlled after the sintering process. Narrow pore size distribution can be achieved, so that an adequate amount of porosity can be added in to the ceramics, while most of mechanical strength can be preserved.

As a further example, two different size cuts of raw materials can be mixed together (e.g., 2 micron particles mixed with 0.5 micron particles and 0.2 micron particles), going through the forming processes described above. After forming, the green body can be subjected to firing at a high temperature, and a near zero porosity containing proppant can be produced.

In the present invention, two or more types of a membrane separation device can be used (e.g., a "dead end filtration" and another type is cross flow membrane separation). The former one can handle a relatively high concentration of slurry, which yield a broader particle size distribution. The later gives very narrow and clean cut particles size distribution.

In the present invention, size control of the raw or starting material, provide the possibility of precise sintering under well controlled firing cycles. So the grain size growth can be controlled, and high strength materials with uniform small grain size materials can be produced under the same specific gravity.

For any of the particle size distributions for any of the materials used to make the proppant of the present invention, these particle size distributions can have a uni-modal distribution, a bi-modal distribution, or a multi-modal distribution.

In the present invention, the number of pores and pore size can be well controlled, so an adequate amount of porosity can be added into a ceramic proppant, while loss of mechanical strength can be minimized. Therefore, high strength/low specific gravity proppant can be produced. Formation of pores is enhanced by the addition of an amorphous material that contains an entrapped vaporizable material such as water and releasing the vaporizable material in a controlled rate.

As an option, in the present invention, the various average particle sizes and/or particle size distributions are the same or about the same with respect to each of the starting materials that form the green body. When the particle sizes of one or more, and, preferably all of the starting materials that can have particle sizes, are about the same or the same, the formation of the green body by mixing the various starting materials together can be more uniform and the distribution of the different starting materials gets distributed throughout the green body in a more uniform way, such that the overall green body and the resulting sintered body, such as the proppant, has a uniform distribution of each of the starting materials, thereby forming a very consistent sintered body having consistent properties throughout the sintered body or selected parts or regions thereof, and thereby reducing the chances of a flaw or defect existing in the sintered body. The average particle size and/or distribution of two or more of the starting materials can be within +/−20% of each other, +/−15% of each other, +/−10% of each other, +/−7% of each other, +/−5% of each other, +/−4% of each other, +/−3% of each other, +/−2% of each other, +/−1% of each other, +/−0.75% of each other, +/−0.5% of each other, +/−0.25% of each other, +/−0.1% of each other, +/−0.05% of each other, or +/−0.01% of each other.

As a result of such techniques, such as the membrane filtration device, the particle size distribution for any of the starting materials, such as the ceramic or ceramic precursor, the microsphere former, metal oxide, metals, (or, for that matter, any particulate starting material) and the like can have a particle distribution that is very tight, such that the particle size distribution as defined herein $(d=[(D_{90}-D_{10})/D_{50}]$, wherein d is 0.4 to 1, such as 0.05 to 0.9, 0.07 to 0.5, 0.09 to 0.4, and the like.

The expression "reactive sintering" as used herein, can include a process wherein heat is applied to a composition, causing that composition to undergo, at least in part, a chemical reaction forming a new composition. The composition is heated to below or about its melting point. Reactive sintering can also include liquid phase sintering, which involves a process of adding an additive to the green body material which will melt before the matrix phase.

The term "green body" or "green pellet" refers to pre-sintered material of the present invention that has been shaped from the compositions, but is not sintered. The mixing step typically provides an aqueous dispersion or paste, which is later dried.

Drying can be performed at a temperature in the range of from about 30° C. to 600° C., such as from about 120° C. to 150° C., and can occur over a period of up to about 48 hours, depending on the drying technique employed. Any type of dryer customarily used in the industry to dry slurries and pastes can be used. Drying can be performed in a batch process using, for example, a stationary dish or container. Alternatively, drying can be performed in a spray dryer, fluid bed dryer, rotary dryer, rotating tray dryer, or flash dryer. The pellets can be screened to provide a suitable median particle size, preferably after drying. For example, a top screen having a mesh size of about 10 or 11 mesh can be used to screen out the largest particles and a bottom screen having a mesh size of about 18 or 20 can be used to remove the finer particles. The choice of top and bottom screens depends, in part, on the mixture produced and can be adjusted to tailor the median particle size of the mixture. A further screening may take place after sintering. The slurry containing the green body material to form the green body can be sprayed or otherwise applied to a hot plate(s) (horizontal or inclined surface). The hot plate can have a metal or ceramic surface. A burner or a series of burners are located under the plate to provide heat to the hot plate surface. The surface is maintained above the evaporation temperature of the solvent (e.g., water) and preferably a lot higher (e.g., at least 10% higher or at least 30% or at least 50% higher in temperature). The droplet sizes are bigger in size than the desired dried size. For instance, the droplet size can be at least 10% larger, at least 50%, at least 100% larger than the final granule size that forms after evaporation occurs. The process/device described in U.S. Pat. No. 5,897,838 (incorporated in its entirety by reference herein) can be adopted as well for this purpose.

The template material can be porous, non-porous, or substantially non-porous. For purposes of the present invention, a substantially non-porous material is a material that is preferably at least 80 vol % non-porous in its entirety, more preferably, at least 90 vol % non-porous. The template material can be a hollow sphere or it can be a closed foam network, and/or can be a non-composite material. A non-composite material, for purposes of the present invention, is a material that is not a collection of particles which are bound together by some binder or other adhesive mechanism. The template material of the present invention can be a single particle. The template material can be a cenosphere or a synthetic microsphere such as one produced from a blowing process or a drop tower process.

The template material can have a crush strength of 5000 psi or less, 3000 psi or less, or 1000 psi or less. In the alternative, the template material can have a high crush strength such as 1000 psi or more, or from about 3000 psi to 10,000 psi. For purposes of the present invention, crush strength can be determined according to API Practice 60 ($2^{nd}$ Ed. December 1995). A template material having a low crush strength can be used to provide means for a coating to be applied in order to form a shell wherein the shell can contribute a majority, if not a high majority, of the crush strength of the overall proppant.

The proppant can be spherical, oblong, nearly spherical, or any other shapes. For instance, the proppant can be spherical and have a Krumbein sphericity of at least about 0.5, at least 0.6, at least 0.7, at least 0.8, or at least 0.9, and/or a roundness of at least about 0.4, at least 0.5, at least 0.6, at least 0.7, or at least 0.9. The term "spherical" refers to sphericity and roundness on the Krumbein and Sloss Chart by visually grading 10 to 20 randomly selected particles.

In accordance with a method(s) of the present invention, the ceramic proppant produced as described above may be used as proppants, gravel or fluid loss agents in hydraulic fracturing and/or frac packing. As stated above, the present invention also relates to a proppant formulation comprising one or more proppants of the present invention with a carrier. The carrier can be a liquid or gas or both. The carrier can be, for example, water, brine, hydrocarbons, oil, crude oil, gel, foam, or any combination thereof. The weight ratio of carrier to proppant can be from 10,000:1 to 1:10,000, or any ratio in between, and preferably about 0.1 g proppant/liter fluid to 1 kg proppant/liter fluid.

The present invention, as one example, relates to a method for producing the material of the present invention as stated herein. The starting components used in the methods described herein can be the same components or precursors of the same components mentioned earlier.

The present invention also relates to a method to make strong, tough, and/or lightweight glass-ceramic matrix composites through a self-toughening structure generated by liquid reactive sintering of a complex mixture of oxides. For purposes of this invention, the glass-ceramic composite can be a material in which glass can comprise from about 0.01% by weight to about 99% by weight (such as 30 wt % to 60 wt %, or 30 wt % to 50 wt %, or 30 wt % to 45 wt %), based on the weight of the composite. The typical composition of the starting mixture can include the following oxides and/or their precursors in one form or another: $Al_2O_3$, $SiO_2$, $Fe_2O_3$, $Fe_3O_4$, $K_2O$, $CaO$, $Na_2O$, $TiO_2$, and $MgO$.

The method can include forming a green body. The green body can be formed from a green body material that includes:
i. at least one metal oxide(s) (and optionally at least two different metal oxides, a first metal oxide and a second metal oxide that is different from the first metal oxide). The metal oxide can be an aluminum oxide or an aluminum bearing mineral (or ore) and/or a silicon oxide or a silicon bearing mineral (or ore) or precursors thereof, and
ii. at least one amorphous material containing at least one entrapped vaporizable material such as water. The amorphous material can contain at least one entrapped vaporizable material, that can be perlite or a similar volcanic glass, and
iii. at least one fluxing agent, preferably nepheline syenite.

The green body is then subjected to sintering under sintering conditions to form in-situ the material of the present invention (e.g., a composite having at least one crystalline phase and at least one amorphous).

The at least one metal oxide or precursor thereof can have any particle size distribution. For example, the particle size distribution, $d_{as}$, can be from about 0.5 to about 15, wherein, $d_{as}=\{(d_{a90}-d_{a10})/d_{a50}\}$ wherein $d_{a10}$ is a particle size wherein 10% of the particles have a smaller particle size, $d_{a90}$ is a median particle size wherein 50% of the particles have a smaller particle size, and $d_{a90}$ is a particle size wherein 90% of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5, and the like. The metal oxide(s) or metal oxide precursor can have a median particle size, $d_{a50}$, of from about 0.01 μm to about 100 μm, wherein $d_{a50}$ is a median particle size where 50% of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% of the particles of the distribution have a smaller particle size.

When two different metal oxides (or precursor thereof) are used, the second metal oxide (or precursor thereof) can have any particle size, such as a particle size distribution, $d_{as}$ that can be from 0.5 to 15, 0.75 to 15, 1 to 15, 1 to 5, 1 to 6, 1 to 8, 5 to 15, 0.5 to 10, 0.5 to 5, or from about 0.5 to about 15, wherein, $d_{as}=\{(d_{s90}-d_{s10})/d_{s50}\}$ wherein $d_{s10}$ is a particle size wherein 10% of the particles have a smaller particle size, $d_{s50}$ is a median particle size wherein 50% of the particles have a smaller particle size, and $d_{s90}$ is a particle size wherein 90% of the particle volume has a smaller particle size. The second metal oxide (or precursor thereof) can have a median particle size, $d_{s50}$, of from about 0.01 μm to about 100 μm, wherein $d_{s50}$ is a median particle size where 50% of the particles of the distribution have a smaller particle size. The median particle size, $d_{s50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{s50}$ is a median particle size where 50% of the particles of the distribution have a smaller particle size.

As an option, the particle size distribution and/or the median particle size of the first metal oxide or precursor thereof and the second metal oxide or precursor thereof can be the same or different, or can be within 1%, 5%, 10%, 15%, 20%, 25% of each other.

The at least one amorphous material containing at least one entrapped vaporizable material such as water can have any particle size distribution. For example, the particle size distribution, $d_{as}$, can be from about 0.5 to about 15, wherein, $d_{as}=\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5, and the like. The at least one amorphous material containing at least one entrapped vaporizable material such as water can have a median particle size, $d_{a50}$, of from about 0.01 μm to about 100 μm, wherein $d_{a50}$ is a median particle size where 50% of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% of the particles of the distribution have a smaller particle size.

The fluxing agent can have any particle size distribution. For example, the particle size distribution, $d_{as}$, can be from about 0.5 to about 15, wherein, $d_{as}=\{(d_{a90}-d_{a10})/d_{50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5, and the like. The fluxing agent can have a median particle size, $d_{a50}$, of from about 0.01 μm to about 100 μm, wherein $d_{a50}$ is a median particle size where 50% of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% of the particles of the distribution have a smaller particle size.

The optional whiskers can be present in an amount of from 0.01 wt % to 40 wt %, such as from about 2% by weight to about 25% by weight, of the green body material. Mullite whiskers can be naturally occurring in cenospheres and can be present in an amount of from about 2% by weight to about 40% by weight of the cenospheres. In addition or alternatively, small mullite whiskers (e.g., a length of 5 microns or less, such as less than 1 micron and/or a diameter less than 1 micron, such as less than 0.5 micron or less than 0.2 micron) directly formed or ground can be added to the green body material, for instance, in an amount of from about 0.5% by weight to about 2% by weight of the green body material.

For exemplary purposes, the following example is provided. Materials other than those mentioned below can be used.

The present invention, as one example, relates to a method for producing a glass-ceramic composite. The method includes the steps of forming a green body. The green body can be formed from a green body material that includes:
  i. alumina and/or at least one alumina precursor.
  ii. at least one amorphous material containing at least one entrapped vaporizable material such as water, and
  iii. at least one fluxing agent The green body is then subjected to sintering under sintering conditions to form a glass-ceramic composite having at least one crystalline phase and at least one amorphous phase.

The alumina precursor can be or include aluminum hydroxide, bauxite, gibbsite, boehmite or diaspore or any combination thereof. The alumina or alumina precursor can have any particle size distribution. For example, the particle size distribution, $d_{as}$, can be from about 0.5 to about 15, wherein, $d_{as}=\{(d_{a90}-d_{a10})/d_{a50}\}$ wherein $d_{a10}$ is a particle size wherein 10% of the particles have a smaller particle size, $d_{a50}$, is a median particle size wherein 50% of the particles have a smaller particle size, and $d_{a90}$ is a particle size wherein 90% of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5, and the like. The alumina or alumina precursor can have a median particle size, $d_{a50}$, of from about 0.01 μm to about 100 μm, wherein $d_{a50}$ is a median particle size where 50% of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% of the particles of the distribution have a smaller particle size.

The at least one amorphous material containing at least one entrapped vaporizable material, such as water, can be perlite, stober silica, any amorphous volcanic rock containing silica, alumina and at least one entrapped vaporizable material, and the like. The at least one amorphous material containing at least one entrapped vaporizable material such as water can have any particle size, and/or can have a particle size distribution, $d_{as}$, that can be from 0.5 to 15, 0.75 to 15, 1 to 15, 1 to 5, 1 to 6, 1 to 8, 5 to 15, 0.5 to 10, 0.5 to 5, 0.5 to about 15, wherein, $d_{as} = \{(d_{s90}-d_{s10})/d_{s50}\}$ wherein $d_{s10}$ is a particle size wherein 10% of the particles have a smaller particle size, $d_{s50}$ is a median particle size wherein 50% of the particles have a smaller particle size, and $d_{s90}$ is a particle size wherein 90% of the particle volume has a smaller particle size. The at least one amorphous material containing at least one entrapped vaporizable material such as water can have a median particle size, $d_{a50}$, of from about 0.01 μm to about 100 μm, wherein $d_{a50}$ is a median particle size where 50% of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% of the particles of the distribution have a smaller particle size.

The fluxing agent can be nepheline syenite, feldspar, synthetic clay, natural clay or any combination thereof. The fluxing agent can have any particle size, such as a particle size distribution, where the $d_{ss}$ can be from 0.5 to 15, 0.75 to 15, 1 to 15, 1 to 5, 1 to 6, 1 to 8, 5 to 15, 0.5 to 10, 0.5 to 5, about 0.5 to about 15, wherein, $d_{ss} = \{(d_{s90}-d_{s10})/d_{s50}\}$ wherein $d_{s10}$ is a particle size wherein 10% of the particles have a smaller particle size, $d_{s50}$ is a median particle size wherein 50% of the particles have a smaller particle size, and $d_{s50}$ is a particle size wherein 90% of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5 and the like. The fluxing agent can have a median particle size, $d_{a50}$, of from about 0.01 μm to about 100 μm, wherein $d_{a50}$ is a median particle size where 50% of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% of the particles of the distribution have a smaller particle size.

As an option, the particle size distribution and/or the median particle size of the alumina or precursor thereof, the at least one amorphous material containing at least one entrapped vaporizable material, and the fluxing agent can be the same or different, or can be within 1%, 5%, 10%, 15%, 20%, 25% of each other.

The green body material can include at least one binder. The binder can be or include a wax, a starch, polyvinyl alcohol, a sodium silicate solution, or a low molecular weight functionalized polymer (e.g., 1,000 MW to 100,000 MW or 500 MW to 5,000 MW) or any combination thereof. A binder may be used to facilitate the formation of the green body mixture.

The green body material can further include at least one dispersant. The dispersant can be or include at least one surfactant. A dispersant may be used to facilitate a uniform mixture of alumina or alumina precursor and a siliceous material in the green body material. Specific dispersants can include, but are not limited to, DOLAPIX CE 64 (Zschimmer & Schwarz, GmbH), DARVAN C (RT Vanderbilt Company, Industrial Minerals & Chemicals), and/or similar materials which may comprise from about 0% by weight to about 5% by weight of the green body material or any other amount to assist in the dispersion of materials.

The green body material can further include at least one slurrying agent. The slurrying agent can be or include water, an organic solvent, or any combination thereof.

The green body can be formed as one material or can be formed as one or more layers of green body material. Each layer can be the same or different from each other with respect to composition and/or thickness. The thickness of each layer can be any amount, such as from 1 micron to 1,000 microns. The thickness can be uniform or non-uniform.

The green body can be produced by spray drying, die pressing, extrusion coating, fluidized bed coating, mixer granulation, high shear mixing, roller compaction injection molding, tumbling, or any combination thereof.

The green body can further include a template, wherein the green body material coats, forms a layer(s), or encapsulates the template, such as a solid or hollow template. The template can be or include a cenosphere, a micro glass sphere, a synthetic cenosphere, a polymer bead, or any combination thereof.

The green body can be formed by deposition of the green body material onto a template such as a hollow template. The deposition can be achieved by spray drying, fluidized bed coating, or any combination thereof. The spray drying can be performed at an air temperature of from about 40° C. to about 90° C., an airflow of from about 90 liters per minute to about 150 liters per minute, and/or a nozzle air pressure of from about 10 psig to about 25 psig.

The sintering can be performed in the presence of a gas. The gas can be or include oxygen, such as from about 100 ppm to about 100% by weight oxygen, or from about 250 ppm to about 90% by weight oxygen, or from about 500 ppm to about 79% by weight oxygen, or from about 1000 ppm to about 50% by weight oxygen.

The sintering can occur in any sintering device (e.g., furnace, oven) such as with induction heating. The sintering is controlled so as to promote reactive or reaction sintering and not solid state sintering. The sintering can occur in a rotary kiln, microwave, tunnel kiln, shutter kiln, electric furnace, gas furnace, convection furnace, roller hearth, chain hearth, pusher sled, vertical shaft furnace, or any combination thereof. The sintering can be self-propagation high temperature sintering, radiation sintering, plasma sintering, spark plasma sintering, and the like.

The sintering can be performed under pressure, such as under a pressure of from about $0.1 \times 10^5$ Pa to about $10 \times 10^5$ Pa, from about $0.5 \times 10^5$ Pa to about $7 \times 10^5$ Pa, or from about $1 \times 10^5$ Pa to about $5 \times 10^5$ Pa.

The sintering can be performed at a temperature from about 500° C. to about 2500° C. The sintering can be preformed at an elevated pressure, for instance, at a pressure of from about 0.1 MPa to about 200 MPa for about 1 hour to about 20 hours or other times. The sintering preferably occurs at a temperature below 1400° C., such as from 1100° C. to about 1300° C., for about 30 minutes to 8 hours, and more preferably from 2 to 6 hours. The sintering temperatures referred to herein are the temperature of the material being sintered. Other sintering temperatures/times can be at a temperature from about 1100° C. to about 1300° C. for about 1 hour to about 20 hours. Another example of the pressure during sintering is from about 0.1 MPa to about 200 MPa.

The sintering can be performed at any firing rate, such as a firing rate of from about 0.01° C./min to about 2000° C./min.

As indicated above, the final product, for instance formed from this method or other methods can be a composite material, such as a glass-ceramic composite material, that is or includes a sintered body having at least one crystalline phase and at least one amorphous phase. The amorphous phase can be or include at least one ceramic or metal oxide. The amorphous phase can further include unreacted particles, such as unreacted metal oxide(s). The composite material can further include a template. The template can be a solid or hollow sphere. The hollow sphere can be or include at least one cenosphere, a micro glass sphere, a synthetic cenosphere, a polymer bead or any combination thereof. The template can have or include at least one whisker phase (e.g., in-situ mullite whisker phase) and at least one amorphous phase.

The amorphous phase can include or be ceramic, and for instance can include alumina and/or silica. The amorphous phase can further include unreacted material (e.g., particles), such as alumina, alumina precursor, siliceous material, and/or the at least one amorphous material containing at least one entrapped vaporizable material, or any combination thereof.

Referring to the preferred method and starting ingredients, the final product, for instance formed from this method or other methods can be a glass-ceramic composite material that is or includes a sintered body having at least one crystalline phase and at least one amorphous phase. The amorphous phase can be or include at least one ceramic, such as alumina and/or silica. The amorphous phase can further include unreacted particles, such as alumina, alumina precursor, siliceous material, or any combination thereof. The composite material can further include a template. The template can be a solid or hollow sphere. The hollow sphere can be or include at least one cenosphere, a micro glass sphere, a synthetic cenosphere, a polymer bead, or any combination thereof. The template can have or include at least one mullite whisker phase (e.g., in-situ mullite whisker phase) and at least one amorphous phase.

The amorphous phase can include or be ceramic, and for instance can include alumina and/or silica. The amorphous phase can further include unreacted material (e.g., particles), such as alumina, alumina precursor, siliceous material, the at least one amorphous material containing at least one entrapped vaporizable material, or any combination thereof.

As indicated, the composite of the present invention can be considered a proppant or used as a proppant.

The proppant can have at least one of the following characteristics:
  a. an overall diameter of from about 90 microns to about 2,000 microns;
  b. a Krumbein sphericity of at least about 0.5 and a roundness of at least about 0.5;
  c. a crush strength of about 1400 psi or greater;
  d. a specific gravity of from about 1.0 to about 3.0;
  e. a porosity of from about 1% to about 70%;
  f. at least 90% of proppant pores or microspheres having a pore size of from about 0.1 μm to about 10 μm,
  g. at least 80% (by number) of proppant pores are not in contact with each other,
  h. pores or microspheres that are spherical or generally spherical in shape and/or have a smooth, glassy interior surface, All of a. through h. can be present, or any two, three, four, five, six, or seven of the properties/characteristics.

The proppants can be used in a method to prop open subterranean formation fractures and can involve introducing a proppant formulation that includes one or proppants of the present invention, into the subterranean formation. The method can be for treating a subterranean producing zone penetrated by a well bore, and can include the steps of preparing or providing a treating fluid that includes a fluid, energized fluid, foam, or a gas carrier having the proppant of the present invention suspended therein, and pumping the treating fluid into the subterranean producing zone whereby the particles are deposited therein. The treating fluid can be a fracturing fluid and the proppant particles can be deposited in the fractures formed in the subterranean producing zone. The treating fluid can be a gravel packing fluid and the particles can be deposited in the well bore adjacent to the subterranean producing zone.

The present invention further relates to a matrix that includes a plurality of the proppants of the present invention and at least one solid matrix material in which the proppant is distributed.

The configuration of the glass-ceramic article being formed can take many shapes including a sphere, elliptical, doughnut shape, rectangular or any shape necessary to fulfill a useful application. In the case of a sphere, the sphere can encapsulate a template. The template may be a hollow or solid, and may be a glassy or glass-ceramic sphere, or an organic sphere. Hollow spheres are typically used as templates in applications where it is desirable to produce particles with low specific gravity. Spheres with an overall diameter from about 90 μm to about 2000 μm are typical for proppants. FIG. 1 shows such a proppant with an outer shell and an inner shell. Mechanical analysis of ceramic or glass-ceramic spheres (including a hollow template under load) indicates that tensile stress is the major cause of the fracture since the ceramic materials are typically strong in compressive strength but weak in tensile strength. Because of this, making the inner shell strong and tough has been a great challenge. The present invention can toughen the inner shell by forming a toughened glassy interface at the surface of the template. The toughened glassy interface can be produced by the at least one amorphous material containing an entrapped vaporizable material, and the fluxing agent. Any unreacted metal oxide particulates, such as alumina and/or other particulate ceramic material(s), can serve as a toughening agent.

Furthermore, the at least one amorphous material containing at least one entrapped vaporizable material, when sintered under controlled conditions, creates small, spherical pores with a smooth, glassy interior surface produced by the liberation of water and/or other vaporizable material. The smooth interior surfaces as described above contribute to increased strength and toughness in the proppant.

In the case of spherical glass-ceramic composite particles including a hollow template, the composition of the outer shell preferably has a coefficient of thermal expansion matching (e.g., within 20%, within 15%, within 10%, within 5%, within 1% of each other) that of the template. If the expansion of the inner and outer shells is significantly different, cracks may form at the interface between the inner and outer shell and strength of the resulting particle is negatively affected. The reactants in the outer shell structure react during firing at typically 1200° C., but can be in the range of 1100° C.-1300° C., to form an alumina/silica composite.

In one preferred method, a glass-ceramic composite may be produced by the following method.

1. Alumina, perlite, and nepheline syenite are ground into an indicated fine particle size and particle size distribution. The alumina, perlite, nepheline syenite and any other components, can be ground independently and blended, or they can be blended and then co-milled. In either case, the alumina can be homogenously mixed with and distributed in the perlite, the nepheline syenite, or other ceramic materials or ingredients.

2. The alumina, perlite, nepheline syenite, any other components, and water are added in a predetermined ratio to a high intensity mixer, and stirred to form a wet homogeneous particulate mixture. Suitable commercially available intensive stirring or mixing devices used for this purpose can have a rotatable horizontal or inclined circular table and a rotatable impacting impeller, such as described in U.S. Pat. No. 3,690,622, the entire disclosure of which is incorporated herein by reference.

3. While the mixture is being stirred, sufficient water can be added to cause the formation of a composite that is essentially spherical pellets of desired size from the mixture of alumina, perlite, nepheline syenite, and any other components such that intense mixing action can rapidly disperse the water throughout the particles. In general, the total quantity of water that is sufficient to cause essentially spherical pellets to form is from about 15 to about 30 percent by weight of the mixture of alumina, perlite, nepheline syenite, and any other components. The total mixing time can be, for example, from about 2 to about 15 minutes or more, or other time periods depending on equipment, settings, compositions, and conditions used. Those of ordinary skill in the art will understand how to determine a suitable amount of water to add to the mixer so that substantially round and spherical pellets are formed.

4. Optionally, a minor amount of mullite whiskers may be added to the green body material. Materials, such as ground cenospheres or fly ash, contain a minor amount of mullite whiskers naturally present in the cenospheres or fly ash.

5. Optionally, a binder, for example, various resins or waxes, starch, or polyvinyl alcohol, may be added to the initial mixture to improve the formation of pellets and to increase the green strength of the unsintered pellets. Suitable binders include, but are not limited to, corn starch, polyvinyl alcohol or sodium silicate solution, or a blend thereof. Liquid binders can be added to the mixture and bentonite and/or various resins or waxes known and available to those of ordinary skill in the art may also be used as a binder. A suitable binder can be, for example, CERAFIX K33 (Zschimmer & Schwarz, Inc.—U.S. Division, Milledgeville, Ga.) or PVA 405 (Kuraray America, Inc., Houston, Tex.) and similar materials, which may be added at levels of from about 0 percent by weight to 10% by weight, or from 0.25% by weight to 1% by weight, or any other amount so as to assist formation of the pellets. Whether to use more or less binder than the values reported herein can be determined by one of ordinary skill in the art through routine experimentation.

6. Optionally, a dispersant such as a surfactant may be added to the initial mixture to improve the homogeneity of the green body material, improve the dispersion of particulates such as the metal oxide(s), pore formers such as SiC, binder and other materials and/or decrease the number of pore former particles that are in contact with each other. The dispersant can effectively reduce the time required to make a uniform mixture. Specific dispersants can include but are not limited to DOLAPIX CE 64 (Zschimmer & Schwarz, GmbH), DARVAN C(RT Vanderbilt Company, Industrial Minerals & Chemicals), and similar materials which may be present in an amount of from about 0% by weight to about 5% by weight of the green body material or any other amount to assist in the dispersion of materials in the slurrying agent.

7. The resulting pellets can be dried and screened to an appropriate pre-sintering size that can compensate for shrinkage that occurs during sintering. Rejected oversized and undersized pellets and powdered material obtained after the drying and screening steps may be recycled. The pellets may also be screened either before drying or after firing or both.

8. The dried pellets are then fired at a sintering temperature for a period sufficient to enable recovery of sintered, spherical pellets having at least one crystalline phase; small, substantially spherical pores with a smooth glassy interior surface; at least one amorphous phase meeting predetermined strength specifications; and intimate contact between the crystalline phase and the amorphous phase from the interior of the proppant through to the surface of the proppant. The sintered pellets can be screened for sizing purposes.

The present invention includes the following aspects/embodiments/features in any order and/or in any combination.

1. The present invention relates to a method for producing a proppant comprising
   a. forming a green body from a green body material comprising
      i. at least one metal oxide or precursor thereof that is capable of forming a crystalline phase in said proppant, and
      ii. at least one amorphous material containing at least one entrapped vaporizable material, and
      iii. at least one fluxing agent (different from i and ii)
   b. reactive sintering said green body under reactive sintering conditions to form a sintered body comprising at least one crystalline phase, at least one amorphous phase, and having gas bubbles contained therein, and wherein said gas bubbles are optionally at least partially surrounded by at least one glassy compound, and a majority of said gas bubbles are not in contact with each other.

2. The method of any preceding or following embodiment/feature/aspect, wherein said metal oxide or precursor thereof comprises aluminum hydroxide, bauxite, gibbsite, boehmite, or diaspore, or any combination thereof 3. The method of any preceding or following embodiment/feature/aspect, wherein said metal oxide or precursor thereof has a particle size distribution, $d_{as}$, of from about 0.5 to about 15, wherein, $d_{as}=\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size.

4. The method of any preceding or following embodiment/feature/aspect, wherein said particle size distribution, $d_{as}$, is from about 1.0 to about 6.0.

5. The method of any preceding or following embodiment/feature/aspect, wherein the median particle size, $d_{a50}$, is from about 0.01 μm to about 100 μm.

6. The method of any preceding or following embodiment/feature/aspect, wherein the median particle size, $d_{a50}$, is from about 1 μm to about 5 μm.

7. The method of any preceding or following embodiment/feature/aspect, wherein said at least one metal oxide comprises a first metal oxide and a second metal oxide, wherein said first metal oxide and said second metal oxide are different from each other.

8. The method of any preceding or following embodiment/feature/aspect, wherein said second metal oxide comprises cenospheres, fly ash, or any combination thereof.

9. The method of any preceding or following embodiment/feature/aspect, wherein said second metal oxide comprises silicate materials, quartz, feldspar, zeolites, bauxite, calcined clay, or any combination thereof.

10. The method of any preceding or following embodiment/feature/aspect, wherein said second metal oxide has a particle size distribution, $d_{ss}$, of from about 0.5 to about 15, wherein, $d_{ss}=\{(d_{s90}-d_{s10})/d_{s50}\}$ wherein $d_{s10}$ is a particle size wherein 10% of the particles have a smaller particle size, $d_{s50}$ is a median particle size wherein 50% of the particles have a smaller particle size, and $d_{s90}$ is a particle size wherein 90% of the particle volume has a smaller particle size.

11. The method of any preceding or following embodiment/feature/aspect, wherein said second metal oxide has a particle size distribution, $d_{ss}$, of from about 1.0 to about 6.0.

12. The method of any preceding or following embodiment/feature/aspect, wherein the median particle size, $d_{s50}$, of said second metal oxide is from about 0.01 μm to about 100 μm.

13. The method of any preceding or following embodiment/feature/aspect, wherein the median particle size, $d_{s50}$, of said second metal oxide is from about 1 μm to about 5 μm.

14. The method of any preceding or following embodiment/feature/aspect, wherein said amorphous material containing at least one entrapped vaporizable material comprises perlite, a stober silica, pumice, andesite, scoria, volcanic glasses, or any combination thereof.

15. The method of any preceding or following embodiment/feature/aspect, wherein said vaporizable material comprises water ($H_2O$), carbon dioxide ($CO_2$), sulfur dioxide ($SO_2$), hydrogen sulfide ($H_2S$), nitrogen, argon, helium, neon, methane, carbon monoxide (CO), hydrogen, oxygen, hydrogen chloride (HCl), hydrogen fluoride (HF), hydrogen bromide (HBr), nitrogen oxide (NOx), sulfur hexafluoride ($SF_6$), carbonyl sulfide (COS), volcanic gases, and any combination thereof.

16. The method of any preceding or following embodiment/feature/aspect, wherein said amorphous material that contains at least one entrapped vaporizable material has a lower specific gravity than other components forming said green body.

17. The method of any preceding or following embodiment/feature/aspect, wherein said amorphous material containing at least one entrapped vaporizable material has a particle size distribution, $d_{as}$, from about 1.0 to about 6.0, wherein, $d_{as}=\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size.

18. The method of any preceding or following embodiment/feature/aspect, wherein the median particle size, $d_{a50}$, of said amorphous material containing at least one entrapped vaporizable material is from about 0.01 μm to about 100 μm.

19. The method of any preceding or following embodiment/feature/aspect, wherein the median particle size, $d_{a50}$, of said amorphous material containing at least one entrapped vaporizable material is from about 1 μm to about 5 p.m.

20. The method of any preceding or following embodiment/feature/aspect, wherein said fluxing agent comprises nepheline syenite, feldspar, synthetic clay, natural clay, or any combination thereof.

21. The method of any preceding or following embodiment/feature/aspect, wherein said fluxing agent has a particle size distribution, $d_{ss}$, from about 0.5 to about 15, wherein, $d_{ss}=\{(d_{s90}-d_{s10})/d_{s50}\}$ wherein $d_{s10}$ is a particle size wherein 10% of the particles have a smaller particle size, $d_{s50}$ is a median particle size wherein 50% of the particles have a smaller particle size, and $d_{s90}$ is a particle size wherein 90% of the particle volume has a smaller particle size.

22. The method of any preceding or following embodiment/feature/aspect, wherein said fluxing agent has a particle size distribution, $d_{ss}$, from about 1.0 to about 6.0.

23. The method of any preceding or following embodiment/feature/aspect, wherein the median particle size, $d_{s50}$, of said fluxing agent is from about 0.01 μm to about 100 μm.

24. The method of any preceding or following embodiment/feature/aspect, wherein the median particle size, $d_{s50}$, of said fluxing agent is from about 1 μm to about 5 μm.

25. The method of any preceding or following embodiment/feature/aspect, wherein said method further comprises forming said green body on a template that is porous or non-porous.

26. The method of any preceding or following embodiment/feature/aspect, wherein said method further comprises forming said green body around a template so as to encapsulate said template.

27. The method of any preceding or following embodiment/feature/aspect, wherein said green body further comprises a hollow template.

28. The method of any preceding or following embodiment/feature/aspect, wherein said hollow template comprises a cenosphere, a micro glass sphere, a synthetic cenosphere, a polymer bead, or any combination thereof.

29. The method of any preceding or following embodiment/feature/aspect, wherein said green body further comprises a hollow template and said reactive sintering forms at least one mullite whisker phase and an amorphous phase in said template.

30. The method of any preceding or following embodiment/feature/aspect, wherein said green body is formed by deposition of said green body material onto said hollow template.

31. The method of any preceding or following embodiment/feature/aspect, wherein said forming a green body is by spray drying, die pressing, extrusion coating, fluidized bed coating, mixer granulation, high shear mixing, roller compaction injection molding, tumbling, or any combination thereof.

32. The method of any preceding or following embodiment/feature/aspect, wherein said deposition comprises spray drying, fluidized bed coating, or any combination thereof.

33. The method of any preceding or following embodiment/feature/aspect, wherein said spray drying is performed at an air temperature from about 40° C. to about 90° C., an air flow of from about 90 liters per minute to about 150 liters per minute, and a nozzle air pressure of from about 10 psig to about 25 psig.

34. The method of any preceding or following embodiment/feature/aspect, wherein said green body material further comprises at least one binder.

35. The method of any preceding or following embodiment/feature/aspect, wherein said binder comprises a wax, a starch, polyvinyl alcohol, a sodium silicate solution, or a low molecular weight functionalized polymer, or any combination thereof.

36. The method of any preceding or following embodiment/feature/aspect, wherein said green body material further comprises at least one dispersant.

37. The method of any preceding or following embodiment/feature/aspect, wherein said dispersant comprises a surfactant.

38. The method of any preceding or following embodiment/feature/aspect, wherein said green body material further comprises at least one slurrying agent.

39. The method of any preceding or following embodiment/feature/aspect, wherein said slurrying agent comprises water, an organic solvent or any combination thereof.

40. The method of any preceding or following embodiment/feature/aspect, wherein said sintering is performed in the presence of a gas.

41. The method of any preceding or following embodiment/feature/aspect, wherein said gas comprises from about 100 ppm to about 100% by weight oxygen.

42. The method of any preceding or following embodiment/feature/aspect, wherein said gas comprises from about 250 ppm to about 90% by weight oxygen.

43. The method of any preceding or following embodiment/feature/aspect, wherein said gas comprises from about 500 ppm to about 79% by weight oxygen.

44. The method of any preceding or following embodiment/feature/aspect, wherein said gas comprises from about 1000 ppm to about 50% by weight oxygen.

45. The method of any preceding or following embodiment/feature/aspect, wherein said green body comprises at least one or more layers of said green body material.

46. The method of any preceding or following embodiment/feature/aspect, wherein said layers are of differing compositions.

47. The method of any preceding or following embodiment/feature/aspect, wherein said reactive sintering comprises induction heating, rotary kiln, microwave, tunnel kiln, shutter kiln, electric furnace, gas furnace, convection furnace, self-propagation high temperature sintering, radiation, plasma, spark plasma, roller hearth, chain hearth, pusher sled, or vertical shaft furnace, or any combination thereof 48. The method of any preceding or following embodiment/feature/aspect, wherein said sintering is performed under a pressure of from about $0.1 \times 10^5$ Pa to about $10 \times 10^5$ Pa.

49. The method of any preceding or following embodiment/feature/aspect, wherein said sintering is performed under a pressure of from about $0.5 \times 10^5$ Pa to about $7 \times 10^5$ Pa.

50. The method of any preceding or following embodiment/feature/aspect, wherein said sintering is performed under a pressure of from about $1 \times 10^5$ Pa to about $5 \times 10^5$ Pa.

51. The method of any preceding or following embodiment/feature/aspect, wherein said sintering is performed at a temperature of from about 500° C. to about 2500° C. and said pressure is from about 0.1 MPa to about 200 MPa for about 1 hour to about 20 hours.

52. The method of any preceding or following embodiment/feature/aspect, wherein said sintering is performed at a temperature of from about 1000° C. to about 1400° C. and said pressure is from about 0.1 MPa to about 200 MPa for about one half hour to about 20 hours.

53. The method of any preceding or following embodiment/feature/aspect, wherein said sintering is performed at a firing rate of from about 0.01° C./min to about 2000° C./min.

54. A proppant comprising a sintered body, wherein said sintered body comprises at least one crystalline phase, at least one amorphous phase, and substantially spherical pores uniformly distributed in said sintered body.

55. The proppant of any preceding or following embodiment/feature/aspect, wherein said crystalline phase is continuous and uniformly distributed throughout said sintered body.

56. The proppant of any preceding or following embodiment/feature/aspect, wherein said crystalline phase is discontinuous and uniformly distributed throughout said sintered body.

57. The proppant of any preceding or following embodiment/feature/aspect, wherein said pores have a smooth, glassy interior surface.

58. The proppant of any preceding or following embodiment/feature/aspect, further comprising a template.

59. The proppant of any preceding or following embodiment/feature/aspect, wherein said template is a sphere.

60. The proppant of any preceding or following embodiment/feature/aspect, wherein said template is a hollow sphere.

61. The proppant of any preceding or following embodiment/feature/aspect, wherein said template is a cenosphere.

62. The proppant of any preceding or following embodiment/feature/aspect, wherein said sintered body encapsulates said template.

63. The proppant of any preceding or following embodiment/feature/aspect, wherein said template comprises whiskers and at least one amorphous phase.

64. The proppant of any preceding or following embodiment/feature/aspect, wherein said proppant has at least one of the following characteristics:
   a. an overall diameter of from about 90 microns to about 2,000 microns;
   b. a Krumbein sphericity of at least about 0.5 and a roundness of at least about 0.5;
   c. a crush strength of about 1400 psi or greater;
   d. a specific gravity of from about 1.0 to about 3.0;
   e. a porosity of from about 1% to about 70%;
   f. at least 90% of proppant pores having a pore size of from about 0.1 μm to about 10 μm, and
   g. pores have a smooth, glassy interior surface, and
   h. at least 80% of proppant pores are not in contact with each other.

65. A method to prop open subterranean formation fractures comprising introducing a proppant formulation comprising the proppant of any preceding or following embodiment/feature/aspect into a subterranean formation.

66. A method of treating a subterranean producing zone penetrated by a well bore comprising the steps of:
   a. preparing or providing a treating fluid that comprises a fluid, energized fluid, foam, or a gas carrier having the proppant of any preceding or following embodiment/feature/aspect suspended therein, and
   b. pumping said treating fluid into said subterranean producing zone whereby said particles are deposited therein.

67. The method of any preceding or following embodiment/feature/aspect, wherein said treating fluid is a fracturing fluid and said particles are deposited in fractures formed in said subterranean producing zone.

68. The method of any preceding or following embodiment/feature/aspect, wherein said treating fluid is a gravel packing fluid and said particles are deposited in said well bore adjacent to said subterranean producing zone.

69. A proppant comprising a sintered sphere having a Krumbein sphericity of at least about 0.5 and a roundness of at least about 0.4, and wherein said sphere comprises a) at least one crystalline phase and b) at least one amorphous phase, c) a plurality of microspheres and, optionally, d) ceramic whiskers, wherein said sintered sphere has a diameter of from about 90 microns to 2,500 microns, and said sintered sphere has a specific gravity of from 0.8 g/cc to about 3.8 g/cc, and said proppant has a crush strength of from about 1,000 psi or greater, and wherein said proppant includes one or more of the following characteristics:
   1) said crystalline phase is present in an amount of at least 30% by weight, based on the weight of the proppant (e.g., at least 40%, at least 50%, at least 60%, at least 70%, at least 80%, at least 90%, such as from 30% to 90%, all based on wt %, based on the weight of the proppant);

2) said amorphous phase is present in an amount of at least 10% by weight, based on the weight of the proppant (e.g., at least 15%, at least 20%, at least 25%, at least 30%, at least 40%, at least 50%, such as from 15% to 70%, all based on wt %, based on the weight of the proppant);
3) said proppant having a porosity from about 1% to 70% by weight where $$\text{porosity } (\%) = 100 - \left(\frac{SG_m}{SG_t}\right) \times 100 \text{ and}$$

$SG_m$=measured specific gravity and
$SG_t$=theoretical specific gravity;
4) said proppant having a porosity from about 5% to 50% by weight;
5) said proppant having a porosity from about 3% to 20% by weight;
6) said proppant having a porosity from about 4% to 16% by weight;
7) said proppant having a specific gravity of from 1.6 to 1.8 with a crush strength of at least 2000 psi;
8) said proppant having a specific gravity of from 1.8 to 2 with a crush strength of at least 3000 psi;
9) said proppant having a specific gravity of from 2 to 2.1 with a crush strength of at least 5,000 psi;
10) said proppant having a specific gravity of from 2.25 to 2.35 with a crush strength of at least 8,000 psi;
11) said proppant having a specific gravity of from 2.5 to 3.2 with a crush strength of at least 18,000 psi;
12) said proppant having a specific gravity of from 2.5 to 3.2 with a crush strength of at least 25,000 psi or at least 30,000 psi;
13) said proppant having a combined clay amount and cristobalite amount of less than 20% by weight of proppant;
14) said proppant having a free alpha-alumina content of at least 5% by weight of said proppant (e.g., 5 wt % to 70 wt % or more, at least 10 wt %, at least 20 wt %, at least 30 wt %, at least 40 wt %, based on the weight of the proppant);
15) said proppant having an HF etching weight loss of less than 35% by weight of said proppant (e.g., less than 30% by weight, less than 25% by weight, less than 20% by weight, less than 15% by weight, less than 10% by weight, such as from 10 wt % to 34 wt %, from 15 wt % to 30 wt %, from 18 wt % to 28 wt % by weight of said proppant);
16) said proppant having said microspheres present as hollow glass microspheres having a particle size distribution, $d_{as}$, of from about 0.5 to about 2.7 (e.g., 0.5 to 2.6, 0.8 to 2.2, 1 to 2, 0.5 to 2, 0.5 to. 1.5, 0.5 to 1), wherein, $d_{as}=\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size;
17) said proppant having microspheres present wherein said microspheres are uniformly present in said proppant or in a layered region of said proppant;
18) said optional ceramic whiskers have an average length of less than 5 microns (e.g., less than 4 microns, less than 3.5 microns, less than 3.2 microns, less than 3 microns, less than 2.7 microns, less than 2.5 microns, less than 2.2 microns, such as from 0.5 micron to 5 microns, or from 1 micron to 3.5 microns, or from 0.8 micron to 3.2 microns, or from 1 micron to 3 microns or from 1.2 to 1.8 microns);
19) said optional ceramic whisker have an average width of less than 0.35 micron (e.g., less than 0.3, less than 0.28, less than 0.25, less than 0.2, less than 0.15, such as from 0.05 to 0.34 micron, from 0.2 to 0.33 micron, from 0.1 to 0.3 micron, from 0.12 to 0.2 micron, all units in microns);
20) said optional ceramic whiskers have a whisker length distribution, $d_{as}$, of about 8 or less (e.g., 7 or less, 6 or less, 5 or less, 4 or less, 3 or less, 2 or less, 1 or less, 0.5 or less, 0.4 or less, 0.3 or less, 0.2 or less, such as 0.1 to 8, 0.1 to 7, 0.1 to 6, 0.1 to 5, 0.1 to 4, 0.1 to 3, 0.1 to 2, 0.1 to 1, 0.1 to 0.75, 0.1 to 0.5, 0.1 to 0.3, 0.1 to 0.2, 0.1 to 1.8), wherein, $d_{as}=\{(d_{a90}-d_{a10})/d_{a50}\}$ wherein $d_{a10}$ is a whisker length wherein 10% of the whiskers have a smaller length, $d_{a50}$ is a median whisker length wherein 50% of the whiskers have a smaller whisker length, and $d_{a90}$ is a whisker length wherein 90% of the whiskers have a smaller whisker length;
21) said optional ceramic whiskers are present in an amount of from 5% to 60% by weight of said proppant (e.g., from 5% to 50%, from 5% to 45%, from 5% to 40%, from 5% to 35%, from 5% to 30%, from 5% to 25%, from 5% to 20%, from 5% to 15%, from 10% to 25%, from 15% to 25%, all by wt % based on the weight of said proppant);
22) said proppant has a combined clay amount and cristobalite amount of less than 20% (e.g., less 15%, less than 10%, less than 5%, less than 1%, such as from 0.1% to 3%, all wt %) by weight of proppant and said mullite whiskers are present in an amount of 60% or more by weight of said proppant (e.g., from 5% to 50%, from 5% to 45%, from 5% to 40%, from 5% to 35%, from 5% to 30%, from 5% to 25%, from 5% to 20%, from 5% to 15%, from 10% to 25%, from 15% to 25%, all by wt % based on the weight of said proppant);
23) said proppant has a uniform composition comprised of both crystalline and amorphous materials that extend from the inner portions of the proppant out through the surface; and/or
24) said whiskers in said proppant are less euhedral and more anhedral.

70. The proppant of any preceding or following embodiment/feature/aspect, wherein one or more of said characteristics provide stress reducing properties on said proppant compared to the same proppant without said one or more characteristics.

71. The proppant of any preceding or following embodiment/feature/aspect, wherein said proppant comprises at least one layered shell encapsulating a hollow spherical template.

72. The proppant of any preceding or following embodiment/feature/aspect, wherein said proppant comprises at least one layered shell encapsulating a hollow spherical template, and said micro-microspheres are present in said at least layered shell.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

Unless stated otherwise, all percents are weight percent based on the weight of the composition or mixture or proppant.

EXAMPLES

Example 1

Example 1 is a proppant formulation containing alumina, perlite, and nepheline syenite. Traditional ceramic processing (powder blending, pressing/spraying, and sintering) was used to make the proppants. The raw, unexpanded perlite powder (Grade #270, Hess Pumice Products, 100 Hess Dr. Malad City, Id. 83252) with initial particle size of 44 μm (−325 mesh), along with alumina powder (Grade AC-300 Ungrounded, Aluchem, 14782 Beaver Pike, Jackson, Ohio 45640) and nepheline syenite powder (Grade A270, Trinity Ceramic Supply Inc., 9016 Diplomacy Row Dallas Tex. 75247) were attrition-milled in water for 0.5 h-5 h to reach final average particle size around 1.50 μm. The following additives were also employed in the slurry. 0.5%-1.5% CERAFIX K33 (ZSCHIMMER & SCHWARZ, 70 GA Highway 22W, Milledgeville, Ga. 31061), 0.3%-0.7% DOLAPIX CE64 (ZSCHIMMER & SCHWARZ, 70 GA Highway 22W, Milledgeville, Ga. 31061), 5%-10% Ball clay (Old Hickory #1 Glaze Clay, Trinity Ceramic Supply Inc., 9016 Diplomacy Row Dallas Tex. 75247), and 0.1%-0.3% Bentone (Bentone EW, Trinity Ceramic Supply Inc., 9016 Diplomacy Row Dallas Tex. 75247) (all wt % of slurry) were added to the slurry during the milling. The solids content in the ready-to-spray slurry was in the range of 30%-40% by weight. A 100N fluid bed sprayer (Applied Chemical Technology, Inc. 4350 Helton Drive, Florence, Ala. 35630) was used to spray the slurry onto the cenosphere template. The green proppants were then sintered in a furnace. One set of proppants was sintered in air at 1225° C. for 2 hours and a second set of proppants was sintered in air at 1250° C. for 2 hrs. After sintering, the proppants were cleaned and polished. FIG. 2 shows the X-ray diffraction pattern from a sintered proppant of this Example 1. Crush strength was measured as % Fines when particles are subjected to a constant load of 15 ksi, according to ISO 13503-2 "Measurement of properties of proppants used in hydraulic fracturing and gravel-packing operations." The specific gravity of the sintered proppants was determined according to ASTM C373-88 (2006) "Standard Test Method for Water Absorption, Bulk Density, Apparent Porosity, and Apparent Specific Gravity of Fired Whiteware Products." The percentage of porosity was determined by the formula below:

$$\text{porosity (\%)} = 100 - \left(\frac{SG_m}{SG_t}\right) \times 100 \text{ and}$$

$SG_m$=measured specific gravity and $SG_t$=theoretical specific gravity;
Test results are summarized in Table 1.

Example 2

Example 2 is a proppant formulation of alumina, perlite, and nepheline syenite components and also including ground cenospheres (described above as an optional ingredient). Traditional ceramic processing (powder blending, pressing/spraying, and sintering) was used to make the proppants. The raw, unexpanded perlite powder (Grade #270, Hess Pumice Products, 100 Hess Dr. Malad City, Id. 83252) with an initial particle size of 44 μm (−325 mesh), along with alumina powder (Grade AC-300 Ungrounded, Aluchem, 14782 Beaver Pike, Jackson, Ohio 45640) and nepheline syenite powder (Grade A270, Trinity Ceramic Supply Inc., 9016 Diplomacy Row Dallas Tex. 75247) were attrition-milled in water for 0.5 h-5 h to reach a final average particle size of around 1.50 μm. The following additives were also employed in the slurry. 0.5%-1.5% CERAFIX K33 (ZSCHIMMER & SCHWARZ, 70 GA Highway 22W, Milledgeville, Ga. 31061), 0.3%-0.7% DOLAPIX CE64 (ZSCHIMMER & SCHWARZ, 70 GA Highway 22W, Milledgeville, Ga. 31061), 5%-10% Ball clay (Old Hickory #1 Glaze Clay, Trinity Ceramic Supply Inc., 9016 Diplomacy Row Dallas Tex. 75247), and 0.1%-0.3% Bentone (Bentone EW, Trinity Ceramic Supply Inc., 9016 Diplomacy Row Dallas Tex. 75247) (all by weight of slurry) were added to the slurry during the milling. The solid content in the ready-to-spray slurry was 30%-40% by weight. A 100N fluid bed spray (Applied Chemical Technology, Inc. 4350 Helton Drive, Florence, Ala. 35630) was used to spray the slurry onto the cenosphere template. The green proppants were then sintered in a furnace. One set of proppants was sintered in air at 1225° C. for 2 hours and a second set of proppants was sintered in air at 1250° C. for 2 hrs. After sintering, the proppants were cleaned and polished. Crush strength was measured as % Fines when particles are subjected to a constant load of 15 ksi, according to ISO 13503-2 "Measurement of properties of proppants used in hydraulic fracturing and gravel-packing operations." The specific gravity of the sintered proppants was determined according to ASTM C373-88 (2006) "Standard Test Method for Water Absorption, Bulk Density, Apparent Porosity, and Apparent Specific Gravity of Fired Whiteware Products." The percentage of porosity was determined by the formula below:

$$\text{porosity (\%)} = 100 - \left(\frac{SG_m}{SG_t}\right) \times 100 \text{ and}$$

$SG_m$=measured specific gravity and $SG_t$=theoretical specific gravity;

TABLE 1

| Formula (wt %) | Milling | Green Body Size | Sintering Temp | Sintering Time | Specific Gravity | Strength (15 Ksi % Fines) |
|---|---|---|---|---|---|---|
| 23.9% Perlite 61.1% Alumina 15% Nepheline Syenite | Non-pH Adjusted | 460 um | 1225° C. | 2 hrs | 2.64 | 8.5 |
|  | D50 = 1.50 um |  |  |  |  |  |
|  | D90 = 3.0 um |  |  |  |  |  |
| 23.9% Perlite 61.1% Alumina 15% Nepheline Senite | Non-pH Adjusted | 460 um | 1250° C. | 2 hrs | 2.69 | 7.7 |
|  | D50 = 1.50 um |  |  |  |  |  |
|  | D90 = 3.0 um |  |  |  |  |  |

Test results are summarized in Table 2.

TABLE 2

| Formula (wt %) | Milling | Green Body Size | Sintering Temp | Sintering Time | Specific Gravity | Strength (15 Ksi % Fines) |
|---|---|---|---|---|---|---|
| 23.9% Perlite 61.1% Alumina 15% Nepheline Syenite | Non-pH Adjusted | 460 um | 1225° C. | 2 hrs | 2.69 | 8.7 |
| | D50 = 1.50 um | | | | | |
| | D90 = 3.0 um | | | | | |
| 24.0% Perlite 58.0% Alumina 15% Nepheline Syenite 3.0% Cenospheres | Non-pH Adjusted | 460 um | 1250° C. | 2 hrs | 2.67 | 8.4 |
| | D50 = 1.50 um | | | | | |
| | D90 = 3.0 um | | | | | |

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for producing a proppant comprising
   a. forming, a green body comprising a hollow template from a green body material comprising
      i. at least one metal oxide or precursor thereof that is capable of forming a crystalline phase in said proppant, and
      ii. at least one amorphous material containing at least one entrapped vaporizable material, and
      iii. at least one fluxing agent
   b. reactive sintering said green body under reactive sintering conditions to form a sintered body comprising at least one crystalline phase, at least one amorphous phase, and having gas bubbles contained therein, and wherein said gas bubbles are optionally at least partially surrounded by at least one glassy compound, and a majority of said gas bubbles are not in contact with each other; and wherein said reactive sintering forms at least one mullite whisker phase and an amorphous phase in said template.

2. The method of claim 1, wherein said metal oxide or precursor thereof comprises aluminum hydroxide, bauxite, gibbsite, boehmite, or diaspore, or any combination thereof.

3. The method of claim 1, wherein said metal oxide or precursor thereof has a particle size distribution, $d_{as}$, of from about 0.5 to about 15, wherein, $d_{as}=\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size.

4. The method of claim 3, wherein the median particle size, $d_{a50}$, is from about 0.01 μm to about 100 μm.

5. The method of claim 1, wherein said at least one metal oxide comprises a first metal oxide and a second metal oxide, wherein said first metal oxide and said second metal oxide are different from each other.

6. The method of claim 5, wherein said second metal oxide has a particle size distribution, $d_{ss}$, of from about 0.5 to about 15, wherein, $d_{ss}=\{(d_{s90}-d_{s10})/d_{s50}\}$ wherein $d_{s10}$ is a particle size wherein 10% of the particles have a smaller particle size, $d_{s50}$ is a median particle size wherein 50% of the particles have a smaller particle size, and $d_{s90}$ is a particle size wherein 90% of the particle volume has a smaller particle size.

7. The method of claim 6, wherein the median particle size, $d_{s50}$, of said second metal oxide is from about 0.01 μm to about 100 μm.

8. The method of claim 1, wherein said amorphous material containing at least one entrapped vaporizable material comprises perlite, a stober silica, pumice, andesite, scoria, volcanic glasses, or any combination thereof.

9. The method of claim 1, wherein said vaporizable material comprises water ($H_2O$), carbon dioxide ($CO_2$), sulfur dioxide ($SO_2$), hydrogen sulfide ($H_2S$), nitrogen, argon, helium, neon, methane, carbon monoxide (CO), hydrogen, oxygen, hydrogen chloride (HCl), hydrogen fluoride (HF), hydrogen bromide (HBr), nitrogen oxide (NOx), sulfur hexafluoride ($SF_6$), carbonyl sulfide (COS), volcanic gases, or any combination thereof.

10. The method of claim 1, wherein said amorphous material that contains at least one entrapped vaporizable material has a lower specific gravity than other components forming said green body.

11. The method of claim 1, wherein said amorphous material containing at least one entrapped vaporizable material has a particle size distribution, $d_{as}$, from about 1.0 to about 6.0, wherein, $d_{as}=\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size.

12. The method of claim 11, wherein the median particle size, $d_{a50}$, of said amorphous material containing at least one entrapped vaporizable material is from about 0.01 μm to about 100 μm.

13. The method of claim 1, wherein said fluxing agent comprises nepheline syenite, feldspar, synthetic day, natural clay, or any combination thereof.

14. The method of claim 1, wherein said method further comprises forming said green body around the template so as to encapsulate said template.

15. The method of claim 1, wherein said sintering is performed in the presence of a gas, wherein said gas comprises from about 100 ppm to about 100% by weight oxygen.

* * * * *